United States Patent
Nagahara

(10) Patent No.: US 11,907,567 B2
(45) Date of Patent: Feb. 20, 2024

(54) MEMORY SYSTEM HAVING A CONTROLLER WITH A DATA ERASURE PROCESSING FUNCTION

(71) Applicant: Kioxia Corporation, Tokyo (JP)

(72) Inventor: Tadashi Nagahara, Minato (JP)

(73) Assignee: Kioxia Corporation, Tokyo (JP)

( * ) Notice: Subject to any disclaimer, the term of this patent is extended or adjusted under 35 U.S.C. 154(b) by 51 days.

(21) Appl. No.: 17/473,294

(22) Filed: Sep. 13, 2021

(65) Prior Publication Data

US 2022/0308789 A1    Sep. 29, 2022

(30) Foreign Application Priority Data

Mar. 24, 2021    (JP) ................................ 2021-049374

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0604; G06F 3/0655; G06F 3/0679; G06F 12/0246; G06F 16/162; G06F 2212/1016; G06F 2212/1056; G06F 2212/7204; G06F 2212/7205; G06F 3/0644; G06F 3/0652
See application file for complete search history.

(56) References Cited

U.S. PATENT DOCUMENTS

| | | |
|---|---|---|
| 8,838,875 B2 | 9/2014 | Park |
| 9,547,655 B1 * | 1/2017 | Wang .................... G06F 16/128 |
| 2014/0281581 A1 | 9/2014 | Kasa |
| 2015/0052292 A1 * | 2/2015 | Mylly .................... G06F 3/0643 711/103 |
| 2016/0124847 A1 * | 5/2016 | Malwankar ............... G06F 9/00 711/103 |
| 2020/0264973 A1 * | 8/2020 | Lee ...................... G06F 13/1668 |

(Continued)

FOREIGN PATENT DOCUMENTS

JP    2006-155461 A    6/2006

OTHER PUBLICATIONS

Wang, K.C. EXT2 File System. In: Systems Programming in Unix/Linux. Springer, Cham. https://doi.org/10.1007/978-3-319-92429-8 11 (Year: 2018).*

(Continued)

*Primary Examiner* — Jane W Benner
(74) *Attorney, Agent, or Firm* — Oblon, McClelland, Maier & Neustadt, L.L.P.

(57) ABSTRACT

According to one embodiment, a memory system is connectable to a host. The memory system includes a non-volatile memory and a controller electrically connected to the non-volatile memory and configured to control the non-volatile memory. The controller is configured to specify a partition format of a predetermined partition included in the non-volatile memory based on master boot record information stored in the non-volatile memory. The controller is configured to specify a file system that manages the predetermined partition. The controller is configured to specify logically erased first data and physically erase the first data when logical erasure of data in the predetermined partition is detected by a method consistent with the specified file system.

10 Claims, 19 Drawing Sheets

(56) References Cited

U.S. PATENT DOCUMENTS

2021/0064386 A1* 3/2021 Bak ................... G06F 3/0644
2021/0133115 A1* 5/2021 Wilson ............... G06F 11/1435

OTHER PUBLICATIONS

"Ext4 Disk Layout," http://ext4.wiki.kernel.org/index.php/Ext4_Disk_Layout, Aug. 26, 2019, 35 pages.

* cited by examiner

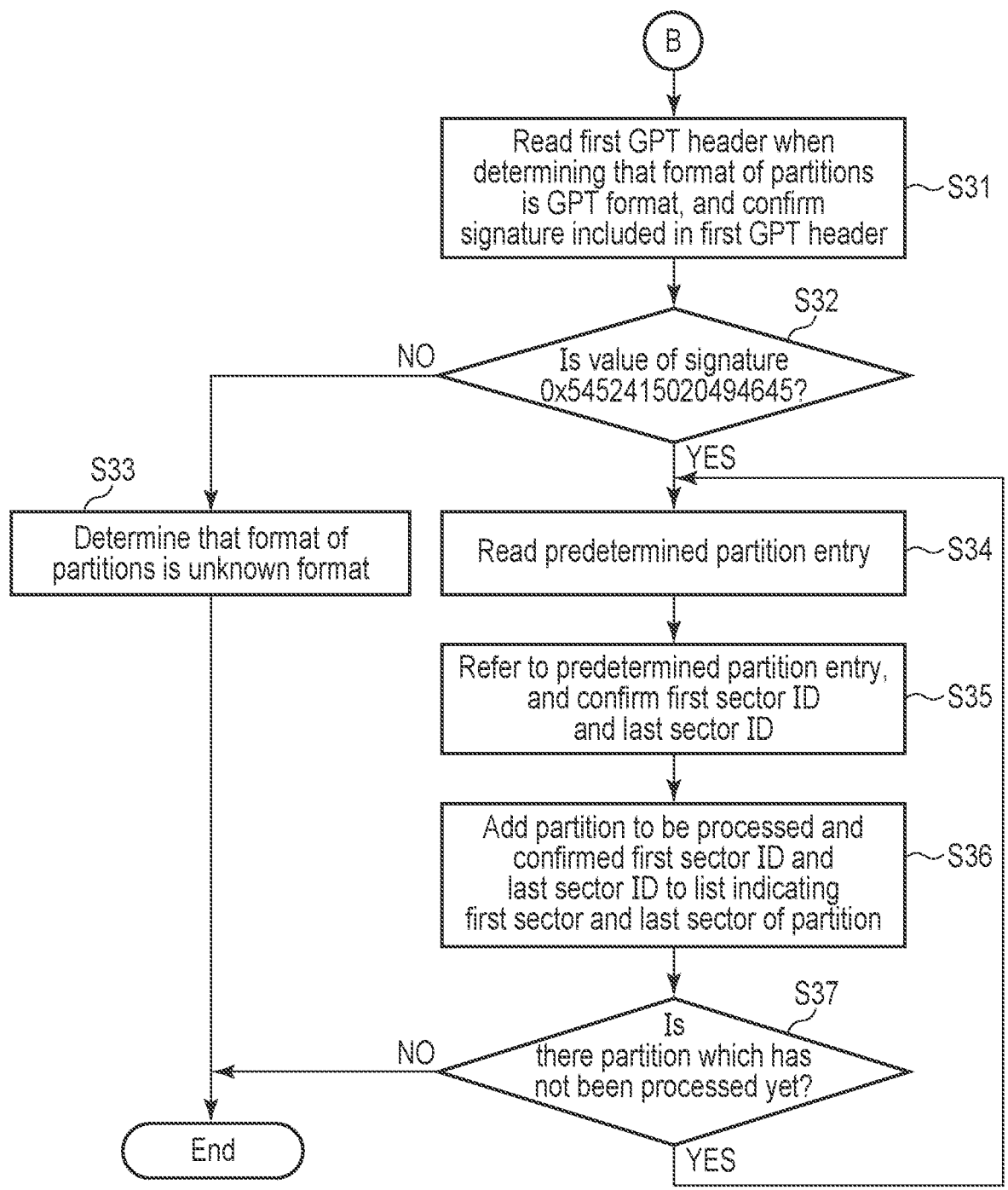
F I G. 7

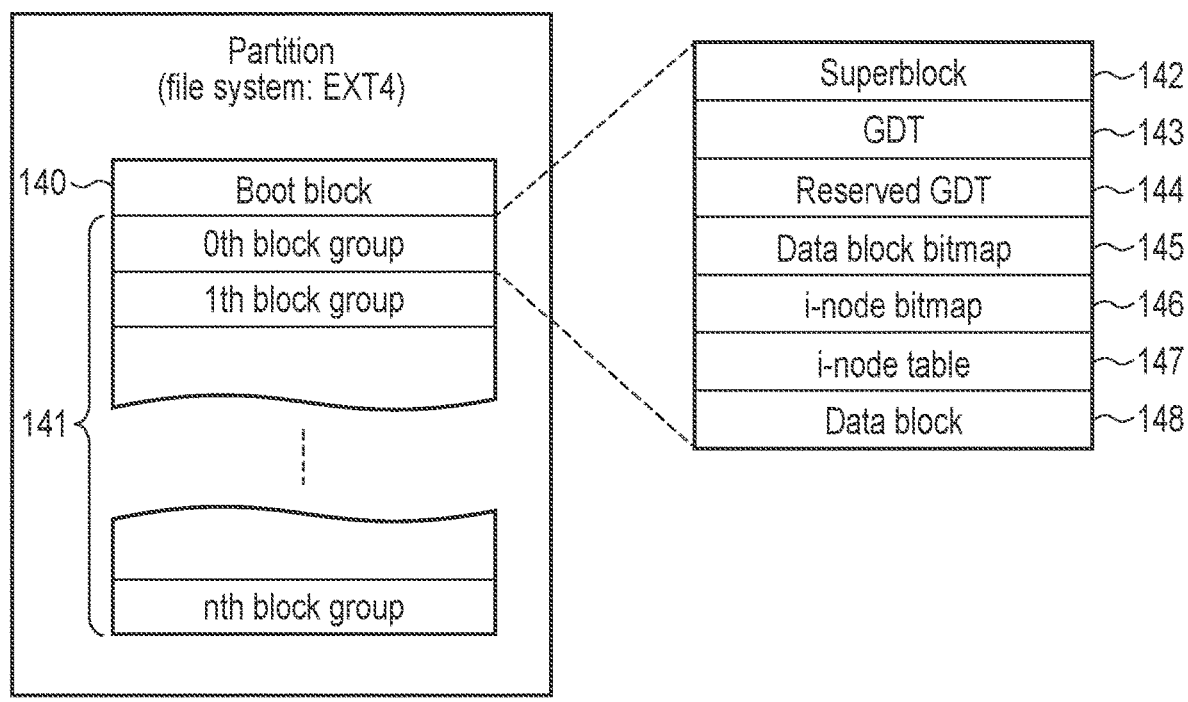
F I G. 12

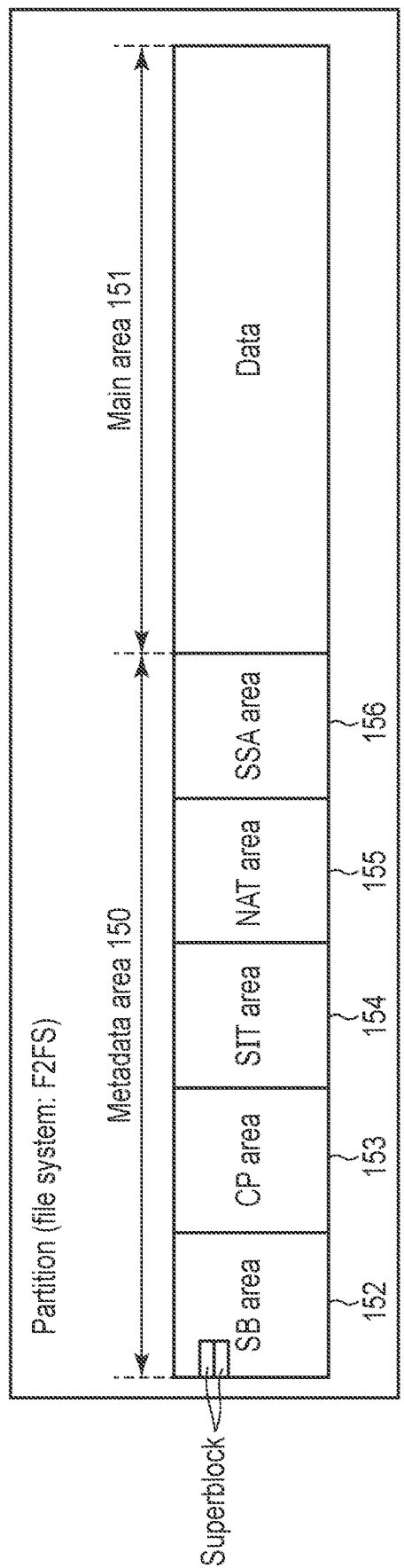
F I G. 14

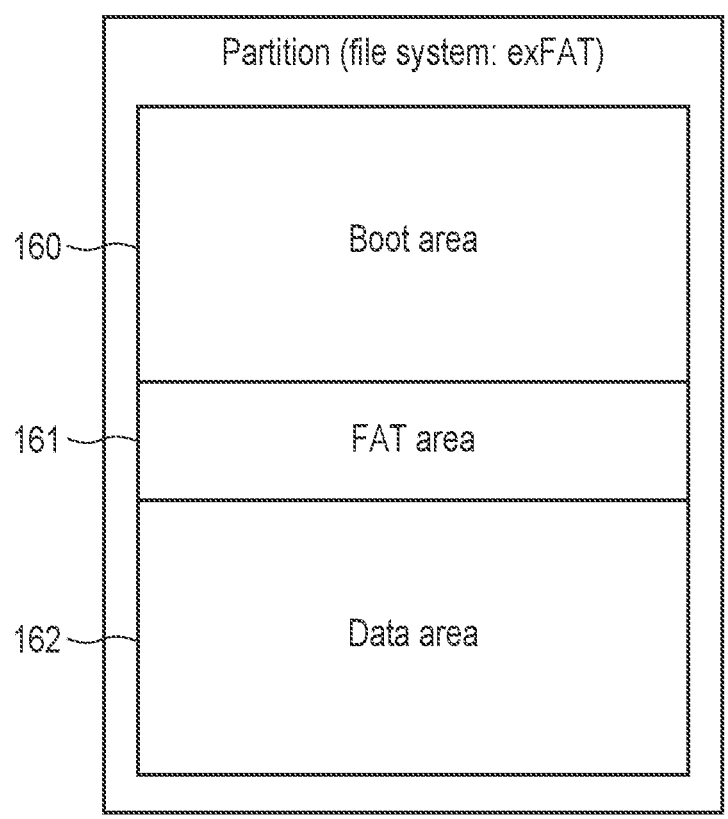
F I G. 16

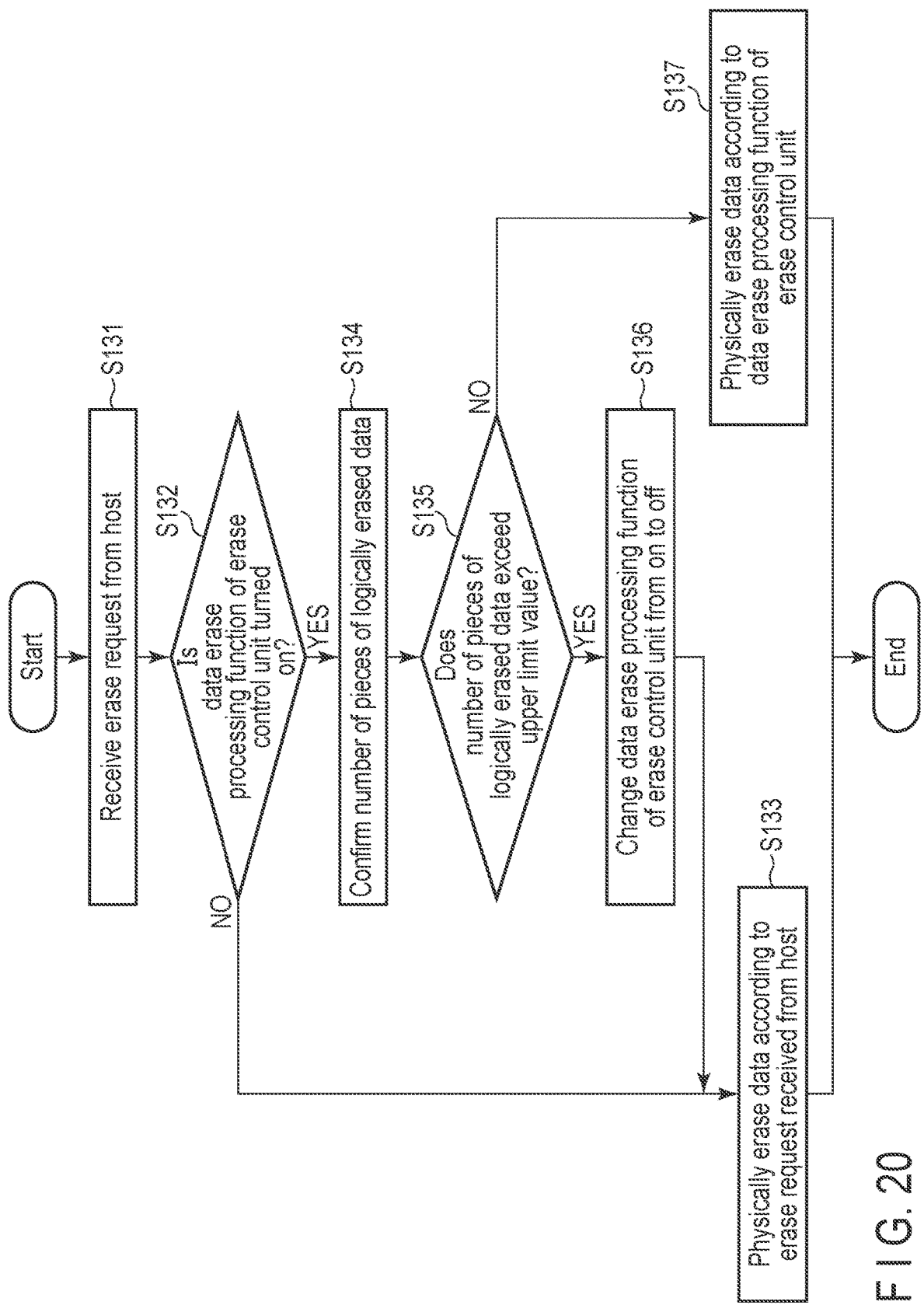
F I G. 20

MEMORY SYSTEM HAVING A CONTROLLER WITH A DATA ERASURE PROCESSING FUNCTION

CROSS-REFERENCE TO RELATED APPLICATIONS

This application is based upon and claims the benefit of priority from Japanese Patent Application No. 2021-049374, filed Mar. 24, 2021, the entire contents of which are incorporated herein by reference.

FIELD

Embodiments described herein relate generally to a technique for controlling a non-volatile memory.

BACKGROUND

In recent years, memory systems including nonvolatile memories have been widely used. As one of such memory systems, solid state drives (SSDs) each implementing a NAND flash memory are known.

SSDs are used as storage devices for various host computing systems, such as servers in data centers.

The storage devices of the host computing systems are required to improve their performance.

BRIEF DESCRIPTION OF THE DRAWINGS

FIG. 7 is a flowchart illustrating a process of specifying another format of each partition included in the NAND flash memory.

FIG. 12 is a diagram illustrating a layout of a file system EXT4.

FIG. 14 is a diagram illustrating a layout of a file system F2FS.

FIG. 16 is a diagram illustrating a layout of a file system exFAT.

FIG. 20 is a flowchart illustrating a process to be executed when an erase request from a host is received.

DETAILED DESCRIPTION

In general, according to one embodiment, a memory system is connectable to a host. The memory system comprises a non-volatile memory and a controller electrically connected to the non-volatile memory and configured to control the non-volatile memory. The controller comprises a data erasure processing function. The controller is configured to specify a partition format of a predetermined partition included in the non-volatile memory based on master boot record information stored in the non-volatile memory. The controller is configured to specify a first sector and a second sector of the predetermined partition based on the specified partition format. The controller is configured to specify a file system that manages the predetermined partition based on first information included in the first sector and second information included in the second sector. The controller is configured to specify logically erased first data and physically erase the first data when logical erasure of data in the predetermined partition is detected by a method consistent with the specified file system.

Hereinafter, embodiments will be described with reference to the drawings.

Figure 1:
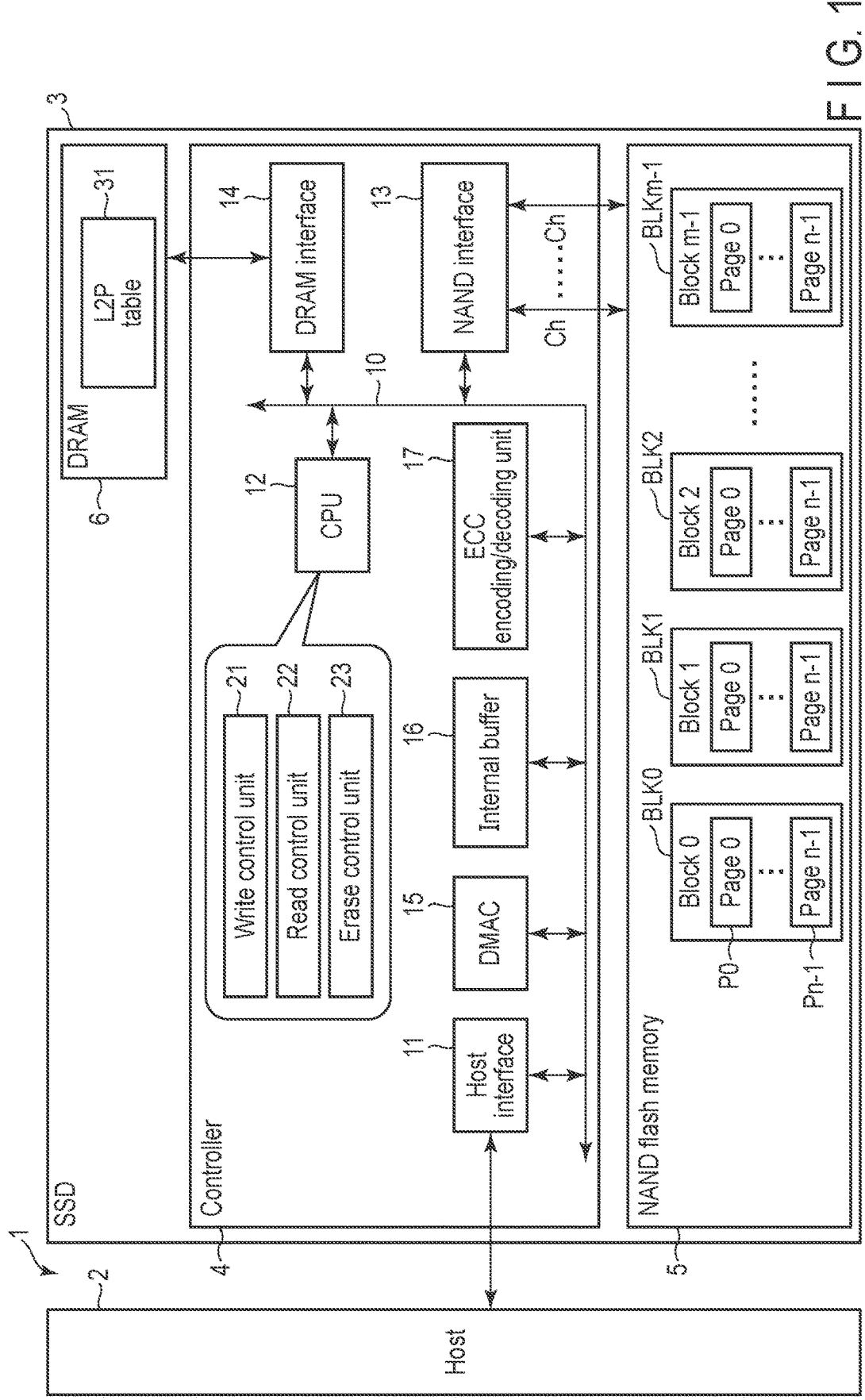
FIG. 1 is a block diagram illustrating a configuration example of a memory system according to an embodiment.

FIG. 1 is the block diagram illustrating a configuration example of an information processing system 1 including a memory system according to an embodiment.

The memory system is a semiconductor storage device configured to write data to a non-volatile memory and read data from the non-volatile memory. This memory system is realized as a solid state drive (SSD) 3 using a NAND flash memory.

The information processing system 1 includes a host (host device) 2 and the SSD 3. The host 2 is realized by an information processing apparatus configured to use the SSD 3 as a storage. The information processing apparatus may be a computer such as a personal computer or server computer, a portable terminal such as a tablet or smartphone, or an in-vehicle terminal such as a car navigation system.

The SSD 3 can be used as an external storage device of the information processing apparatus functioning as the host 2. The SSD 3 may be built in the information processing apparatus, or may be connected to the information processing apparatus via a cable, a network, or the like.

The interface for interconnecting the host 2 and the SSD 3 is not limited thereto, but PCI Express (PCIe) (registered trademark), NVM Express (NVMe) (registered trademark), Ethernet (registered trademark), or NVMe over Fabrics (NVMeoF) can be used.

The SSD 3 includes a controller 4 and a non-volatile memory (NAND flash memory) 5. The SSD 3 may include a random access memory, for example, a DRAM 6.

The NAND flash memory 5 includes a memory cell array including a plurality of memory cells arranged in a matrix. The NAND flash memory 5 may be a NAND flash memory having a two-dimensional structure or a NAND flash memory having a three-dimensional structure.

The memory cell array of the NAND flash memory 5 includes a plurality of blocks BLK0 to BLKm−1. Each of the blocks BLK0 to BLKm−1 includes a plurality of pages (here, pages P0 to Pn−1). Each of the blocks BLK0 to BLKm−1 is a unit of erasing (erasing) data. The block may also be referred to as an "erase block", a "physical block", or a "physical erase block". Each of the pages P0 to Pn−1 is a unit of writing and reading data. The page may also be referred to as a "data block" or "sector".

The controller 4 is electrically connected to the NAND flash memory 5, which is a non-volatile memory, via a NAND interface 13 such as a Toggle NAND flash interface or an Open NAND flash interface (ONFI). The controller 4 operates as a memory controller configured to control the NAND flash memory 5. The controller 4 may be realized by a circuit such as a system-on-a-chip (SoC).

The NAND flash memory 5 may include a plurality of NAND flash memory chips (NAND flash memory dies). In this case, the NAND interface 13 may be connected to the NAND flash memory chips via a plurality of channels (Ch).

The controller 4 can function as a flash translation layer (FTL) configured to execute data management and block management of the NAND flash memory 5. The data management executed by the FTL includes (1) management of mapping information indicating a correspondence relationship between each logical address and each physical address of the NAND flash memory 5, and (2) processing for wrapping constraints (for example, read/write operation in units of page and erase operation in units of blocks) of the NAND flash memory 5. The logical address is an address used by the host 2 to address a location of the SSD 3 in the logical address space. As the logical address, a logical block address (addressing) (LBA) can be generally used.

Management of mapping between each logical address used by the host 2 to access the SSD 3 and each physical address of the NAND flash memory 5 is executed using an address conversion table (logical-to-physical address conversion table: L2P table) 31. Using the L2P table 31, the controller 4 manages mapping between each logical address and each physical address in units of a predetermined management size. The physical address corresponding to a certain logical address indicates a latest physical storage location in the NAND flash memory 5 in which the data corresponding to the logical address is written. The L2P table 31 may be loaded from the NAND flash memory 5 to the DRAM 6 when the SSD 3 is powered on. The entire L2P table 31 may be loaded into the DRAM 6 when the SSD 3 is powered on, or a necessary portion of the L2P table 31 may be loaded each time the SSD 3 is in operation.

In the NAND flash memory 5, data can be written to a page only once per erase cycle. That is, new data cannot be directly overwritten on a page (data block) in which data has already been written. Therefore, when updating (changing) data that has already been written, the controller 4 writes new data (updated data) in an unused area (unwritten area) in a block (or another block) including the data, and handles the previous data as invalid data. In other words, the controller 4 writes the updated data corresponding to a certain logical address, not to a physical storage location where the previous data corresponding to the logical address is stored, but to another physical storage location. Then, the controller 4 updates the L2P table 31, associates the logical address with the another physical storage location, and invalidates the previous data.

The block management includes, for example, garbage collection (GC). The GC may also be referred to as "compaction". The GC is an operation for increasing a number of free blocks. The free block means a block that does not include valid data and invalid data. In the GC, the controller 4 moves valid data in a block in which the valid data and invalid data are mixed to another block (for example, a free block). Then, the controller 4 updates the L2P table 31 and maps a physical address of the movement destination to a logical address of the moved valid data. The controller 4 physically erases data in the block in which only the invalid data is remained by moving the valid data to the another block. As a result, the block in which the data has been physically erased is released as a free block, and can be reused for writing data.

Here, the valid data means data associated with a certain logical address. For example, data referred from the L2P table 31 (that is, data associated as a latest data from the logical address) is valid data, and may be read from the host 2 later. The invalid data is data not associated with any logical address, and means logically erased data. The data that is not associated with any logical address is data that is no longer likely to be read from the host 2.

The controller 4 includes a host interface 11, a CPU 12, the NAND interface 13, a DRAM interface 14, a direct memory access controller (DMAC) 15, an internal buffer 16, an ECC encoding/decoding unit 17, and the like. The host interface 11, the CPU 12, the NAND interface 13, the DRAM interface 14, the direct memory access controller (DMAC) 15, the internal buffer 16, and the ECC encoding/decoding unit 17 are interconnected via a bus 10.

The host interface 11 is a host interface circuit configured to execute communication with the host 2. The host interface 11 may be, for example, a PCIe controller (NVMe controller). Alternatively, in a configuration in which the SSD 3 is connected to the host 2 via Ethernet (registered trademark), the host interface 11 may be an NVMe over Fabrics (NVMeoF) controller.

The host interface 11 receives various commands from the host 2. These commands include a write command (write request), a read command (read request), and various other commands.

The write command is a command (write request) for writing data (write data) to be written to the SSD 3, and includes a logical address (start LBA) of the write data, a length of the write data, a data pointer (buffer address) indicating a position in a write buffer in a memory of the host 2 in which the write data is stored, and the like.

The read command is a command (read request) for reading data from the SSD 3, and includes a logical address (start LBA) of data to be read, a length of the data, a data pointer (buffer address) indicating a position in the read buffer in the memory of the host 2 to which the data is to be transferred, and the like.

The CPU 12 is a processor configured to control the host interface 11, the NAND interface 13, and the DRAM interface 14. In response to power-on of the SSD 3, the CPU 12 loads a control program (firmware) from the NAND flash memory 5 or a ROM (not illustrated) into the DRAM 6, and executes the firmware to execute various processes. Note that the firmware may be loaded on an SRAM (not illustrated) in the controller 4. The CPU 12 can execute command processing or the like for processing various commands from the host 2. The operation of the CPU 12 is controlled by the above-described firmware. Part or all of the command processing may be executed by dedicated hardware in the controller 4.

In the controller 4, a write control unit 21, a read control unit 22, and an erase control unit 23 are present as components for realizing the FTL. The write control unit 21, the read control unit 22, and the erase control unit 23 may be realized by the above-described firmware executed by the CPU 12. Note that a part or all of each of the write control unit 21, the read control unit 22, and the erase control unit 23 may also be realized by dedicated hardware in the controller 4.

The write control unit 21 executes a process for writing write data associated with the write command to the NAND flash memory 5 in response to the write command (write request) received from the host 2. The read control unit 22 receives a read command from the host 2 and reads data designated by the read command received from the NAND flash memory 5. Since the erase control unit 23 will be described later, a detailed description thereof will be omitted here.

The NAND interface 13 is a memory control circuit configured to control the NAND flash memory 5 under control of the CPU 12.

The DRAM interface 14 is a DRAM control circuit configured to control the DRAM 6 under the control of the CPU 12. A part of the storage area of the DRAM 6 may be used as a storage area for the L2P table 31.

DMAC 15 executes data transfer between the memory of the host 2 and the internal buffer 16 under the control of the CPU 12. When the write data is to be transferred from the write buffer in the memory of the host 2 to the internal buffer 16, the CPU 12 designates a transfer source address indicating a position on the write buffer in the memory of the host 2, a data size, and a transfer destination address indicating a position on the internal buffer 16 for the DMAC 15.

When data is to be written to the NAND flash memory 5, the ECC encoding/decoding unit 17 encodes the data (data to be written) (ECC encoding) to add an error correction code (ECC) as a redundant code to the data. When data is read from the NAND flash memory 5, the ECC encoding/decoding unit 17 performs error correction of the data using the ECC added to the read data (ECC decoding).

As described above, logical erasure of certain data and invalidating the data does not mean that a block including the invalidated data will be released as a free block. That is, since a storage area of the NAND flash memory 5 is not necessarily released, the storage area may be uselessly used by the invalid data. Although this situation can be solved by the GC or the like described above, the GC is mainly executed when an unused area in the NAND flash memory 5 becomes smaller than a predetermined value or when an instruction is received from the host 2. Therefore, the above-described situation cannot be always solved.

The erase control unit 23 according to the present embodiment monitors a state of the NAND flash memory 5, and when detecting an increase in invalid data (that is, when logical erasure of data is detected), actively executes a data erasing process of physically erasing the invalid data and releasing a block including the invalid data as a free block. The host 2 or the controller 4 controls on/off of this function (data erase processing function) of the erase control unit 23, and as long as this function is turned on, the erase control unit 23 actively executes the data erasing process (for example, at every lapse of a predetermined period).

Hereinafter, a structure of the NAND flash memory 5 will be described, and then the data erasing process executed by the erase control unit 23 will be described in detail.

Figure 2:
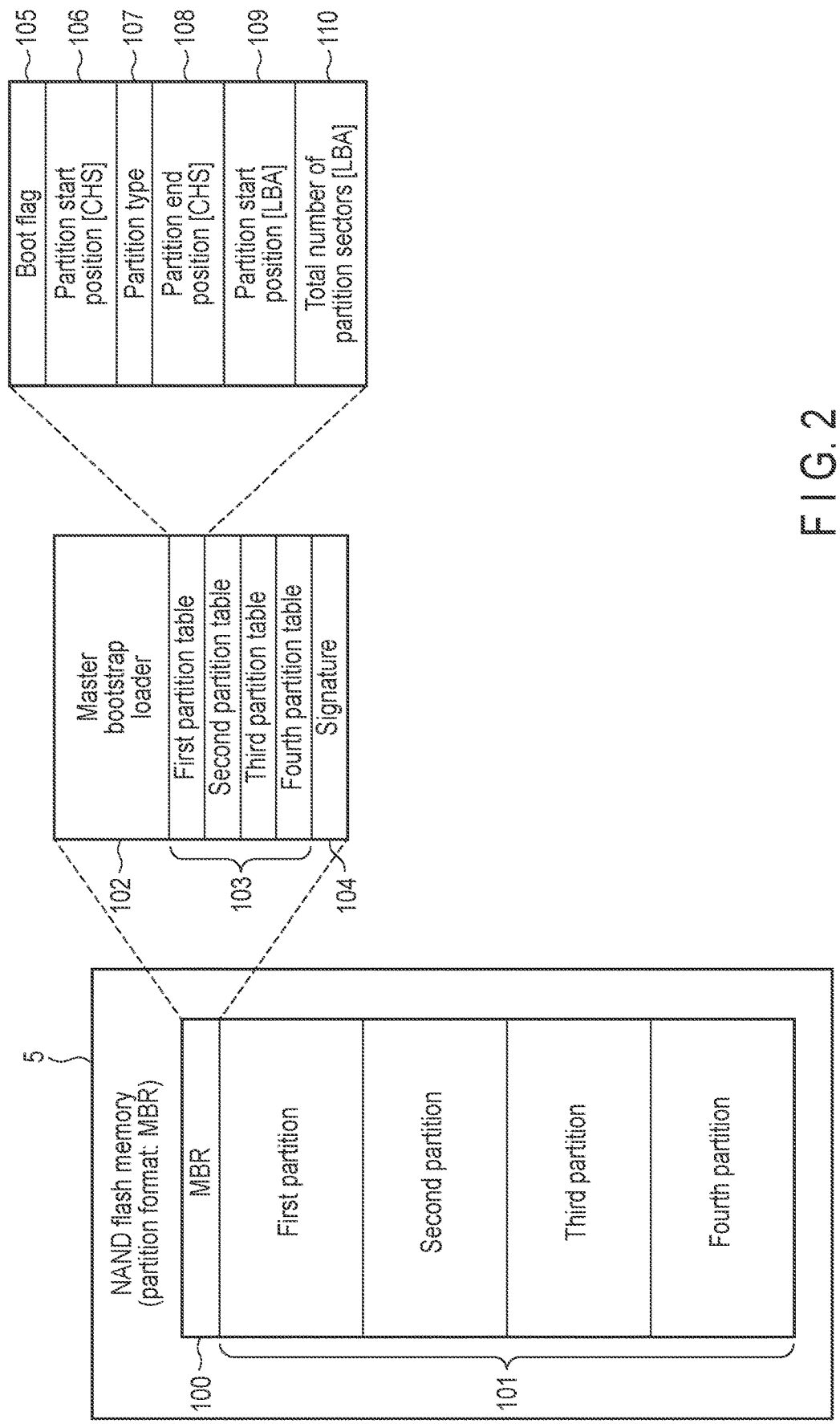
FIG. 2 is a diagram illustrating a structure of a NAND flash memory.

FIG. 2 is the diagram illustrating a structure of the NAND flash memory 5. The NAND flash memory 5 is divided into a plurality of partitions. FIG. 2 illustrates a case where a format of the partitions dividing the NAND flash memory 5 is an MBR format. Therefore, the NAND flash memory 5 includes up to four partitions 101 (first to fourth partitions).

A master boot record (MBR) 100 is arranged in a head sector of the NAND flash memory 5. The MBR 100 includes a master bootstrap loader 102. The master bootstrap loader 102 searches for an active partition from among the partitions included in the NAND flash memory 5, loads a bootstrap loader included in the partition, and passes the control to the bootstrap loader. In addition to the master bootstrap loader 102, the MBR 100 further includes partition tables 103 (first to fourth partition tables) corresponding to the partitions included in the NAND flash memory 5, and a signature 104. The signature 104 is an identifier for determining whether the MBR 100 including the signature 104 is valid, and a value of "0x80" is set when the MBR 100 is valid.

The partition tables 103 each include configuration information of a corresponding partition. Specifically, the partition tables 103 each include a boot flag 105, a partition start position 106, a partition type 107, a partition end position 108, a partition start position 109, and a total number of partition sectors 110, respectively.

The boot flag 105 is an identifier for determining whether the corresponding partition is an active partition, and a value of "0x80" is set when the corresponding partition is the active partition. The partition start position 106 indicates a start position of the corresponding partition (that is, a first sector of the corresponding partition) in a CHS scheme. The partition type 107 indicates a type of OS or a type of file system using the corresponding partition. The partition end position 108 indicates an end position of the corresponding partition (that is, a last sector of the corresponding partition) in the CHS scheme. The partition start position 109 indicates a start position of the corresponding partition (that is, a sector ID of a first sector of the corresponding partition) in an LBA scheme. The total number of partition sectors 110 indicates the total number of sectors included in the corresponding partition in the LBA scheme.

Figure 3:
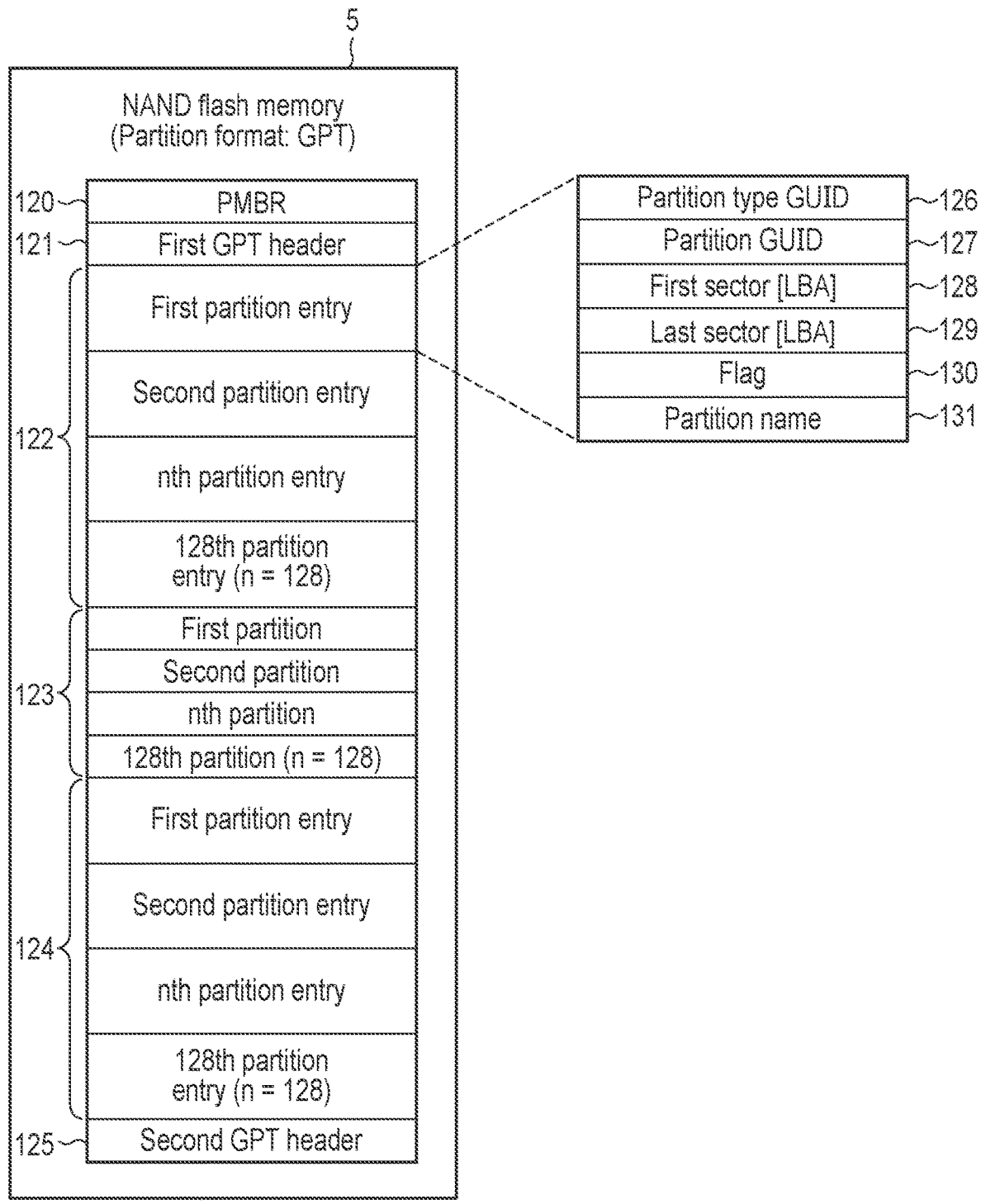
FIG. 3 is a diagram illustrating another structure of the NAND flash memory.

FIG. 3 is the diagram illustrating another structure of the NAND flash memory 5. The NAND flash memory 5 is divided into a plurality of partitions. FIG. 3 illustrates a case where a format of the partitions dividing the NAND flash memory 5 is a GUID partition table (GPT) format. Therefore, the NAND flash memory 5 includes up to 128 partitions 123 (first to 128th partitions).

A protective master boot record (PMBR) 120 is arranged in a head sector of the NAND flash memory 5. The PMBR 120 includes dummy partition information for protecting partitions in the GPT format and is recorded in a same format as the MBR 100. The NAND flash memory 5 includes, in addition to the PMBR 120 and the partitions 123, a first GPT header 121, a first GPT entry array 122, a second GPT entry array 124, and a second GPT header 125.

The first GPT header 121 defines the number and size of partition entries. The first GPT header 121 includes a signature, a GUID of the disk, a size and position of the first GPT header 121, a size and position of the second GPT header 125, a CRC 32 checksum, and the like.

The first GPT entry array 122 includes partition entries (first partition entry to 128th partition entry) corresponding to the partitions included in the NAND flash memory 5.

Each partition entry includes configuration information of a corresponding partition. Specifically, the partition entries each include a partition type GUID 126, a partition GUID 127, a first sector 128, a last sector 129, a flag 130, and a partition name 131.

The partition type GUID 126 is a GUID indicating a type of OS or a type of file system that is using the corresponding partition. The partition GUID 127 is a GUID indicating the corresponding partition. The first sector 128 indicates a sector ID of a first sector of the corresponding partition in the LBA scheme. The last sector 129 indicates a sector ID of a last sector of the corresponding partition in the LBA scheme. The flag 130 indicates an attribute of the corresponding partition. The partition name 131 indicates a name set for the corresponding partition.

The second GPT entry array 124 includes a copy (backup) of the first GPT entry array 122. The second GPT header 125 includes a copy (backup) of the first GPT header 121.

Note that information included in the MBR 100 and the PMBR 120 respectively illustrated in FIGS. 2 and 3 may be collectively referred to as MBR information.

Hereinafter, the data erasing process executed by the erase control unit 23 will be described in detail. The data erasing process executed by the erase control unit 23 includes (1) a process of specifying a format of partitions included in the NAND flash memory 5, (2) a process of specifying each type of file system that manages each partition, (3) a process of detecting whether data has been logically erased and physically erasing data when the logical erasure of the data is detected, and the like.

First, (1) the process of specifying a format of partitions included in the NAND flash memory 5 will be described in detail with reference to the flowcharts of FIGS. 4 to 7. FIGS. 4 to 7 are flowcharts illustrating examples of a processing procedure to be executed by the erase control unit 23 to specify the format of the partitions included in the NAND flash memory 5.

Figure 4:
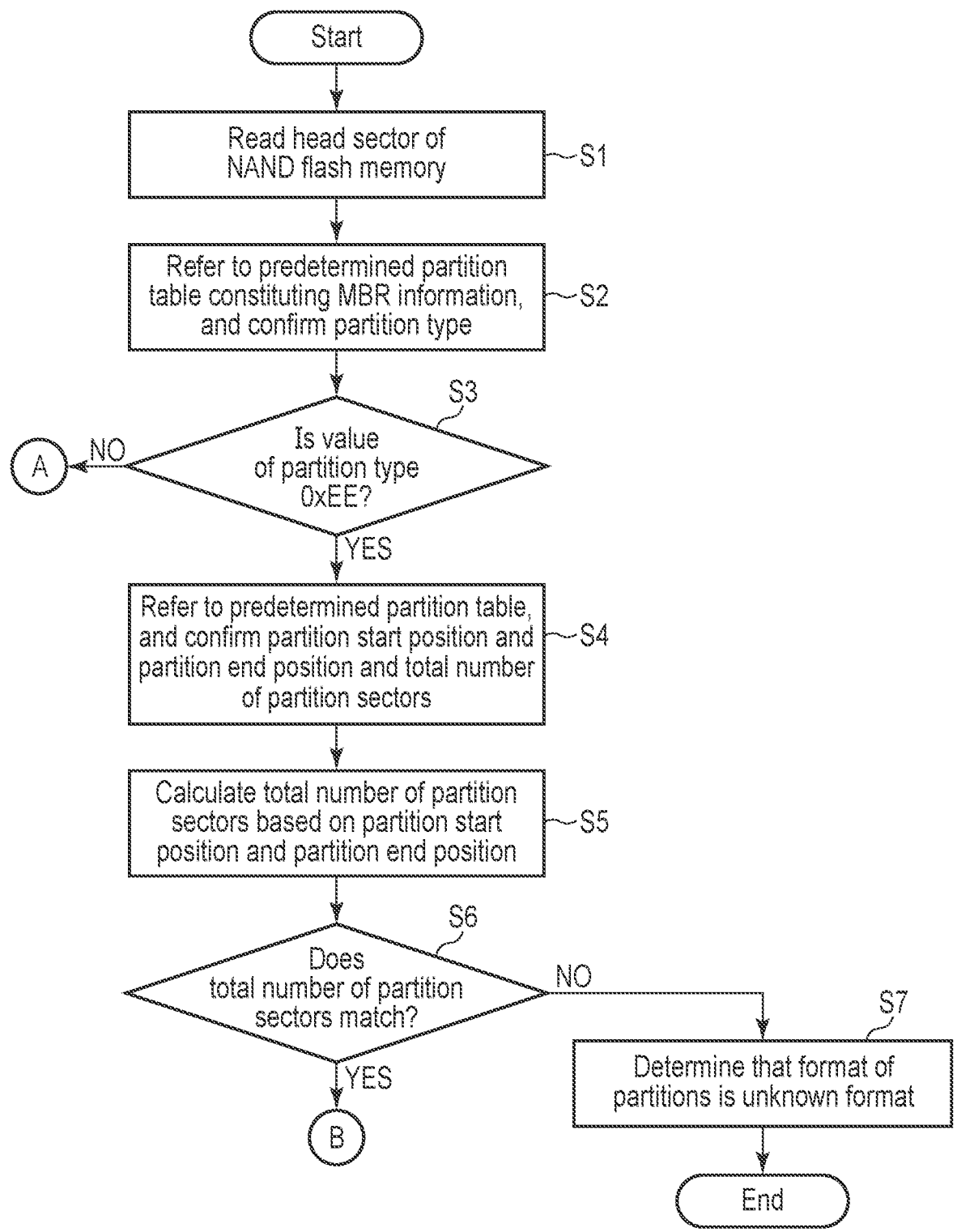
FIG. 4 is a flowchart illustrating a process of specifying a format of partitions included in the NAND flash memory.

In FIG. 4, a process of determining whether the format of partitions is the MBR format or the GPT format will be mainly described.

First, the erase control unit 23 reads the head sector of the NAND flash memory 5 in order to acquire the MBR information (step S1), and refers to a predetermined partition table constituting the MBR information included in the read head sector to confirm the partition type (step S2).

Next, the erase control unit 23 determines whether the value of the confirmed partition type is "0xEE" indicating a GPT PMBR (step S3). When it is determined in the process of step S3 that the value of the confirmed partition type is not "0xEE" (NO in step S3), the erase control unit 23 determines that the format of the partitions included in the NAND flash memory 5 is the MBR format, and executes a process of step S11 illustrated in FIG. 5 to be described later.

On the other hand, when it is determined in the process of step S3 that the value of the confirmed partition type is "0xEE" (YES in step S3), the erase control unit 23 refers to the partition table referred to in step S2 again, and confirms a partition start position and a partition end position indicated in the CHS scheme and a total number of partition sectors indicated in the LBA scheme (step S4).

The erase control unit 23 calculates a total number of partition sectors indicated in the LBA scheme based on the partition start position and the partition end position indicated in the CHS scheme, which have been confirmed (step S5), and determines whether the calculated total number of partition sectors matches the total number of partition sectors confirmed in the process of step S4 (step S6).

In the process of step S6, when it is determined that the calculated total partition sector number matches the confirmed total partition sector number (YES in step S6), the erase control unit 23 determines that the format of the partition included in the NAND flash memory 5 is the GPT format, and executes a process of step S31 illustrated in FIG. 7 to be described later.

On the other hand, when it is determined in the process of step S6 that the calculated total partition sector number does not match the confirmed total partition sector number (NO in step S6), the erase control unit 23 determines that there is a contradiction and determines that the format of the partition included in the NAND flash memory 5 is an unknown format (that is, it is determined that the partition format is neither the MBR format nor the GPT format) (step S7), and ends the series of processes here.

Figure 5:
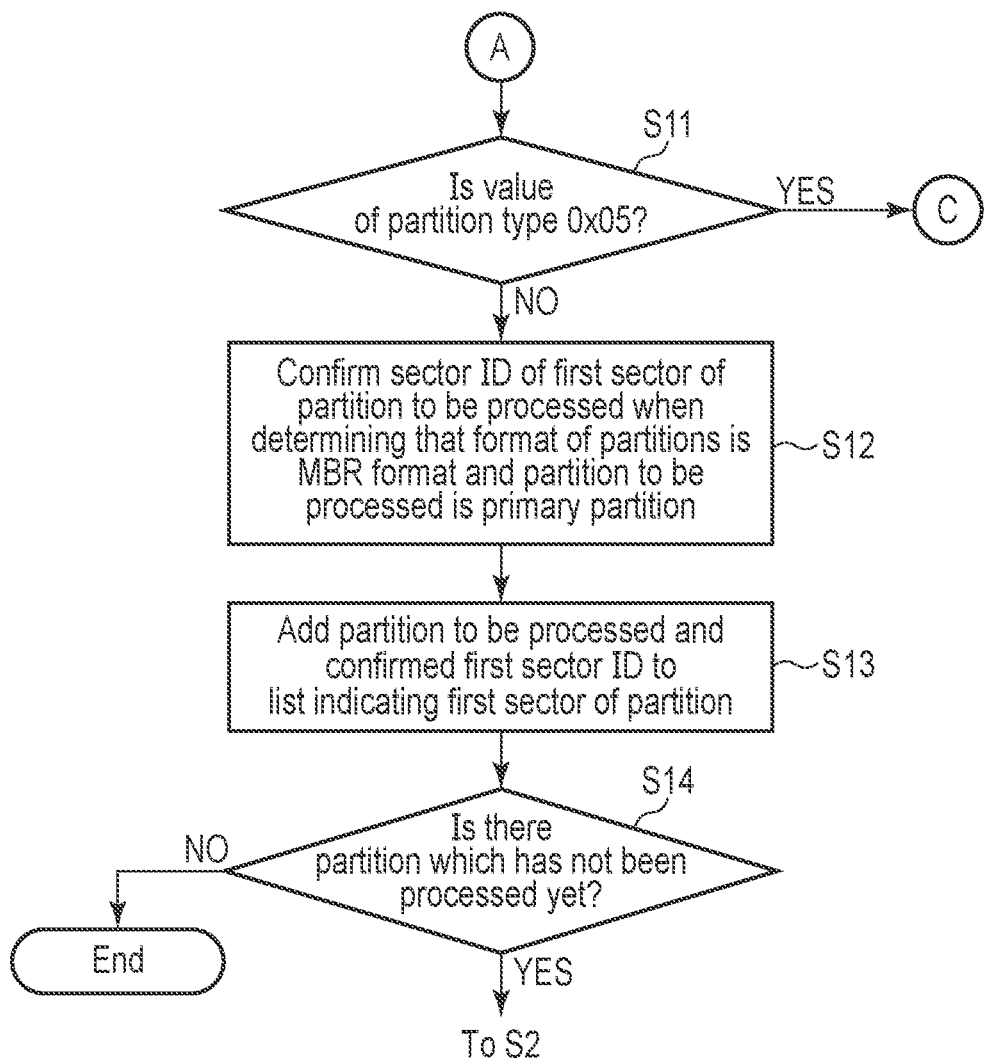
FIG. 5 is a flowchart illustrating a process of specifying another format of each partition included in the NAND flash memory.

Next, the flowchart of FIG. 5 will be described. In FIG. 5, a process to be executed when it is determined whether a partition is a primary partition or an extended partition, and the partition is the primary partition, will be mainly described.

In the process of step S3 shown in FIG. 4, when it is determined that the value of the confirmed partition type is not "0xEE" (NO in step S3), the erase control unit 23 determines whether or not the value of the confirmed partition type is "0x05" indicating an extended DOS partition (step S11). When it is determined in the process of step S11 that the value of the confirmed partition type is "0x05" (YES in step S11), the erase control unit 23 determines that the format of the partition included in the NAND flash memory 5 is the MBR format and the partition to be processed this time is the extended partition, and executes a process of step S21 illustrated in FIG. 6 to be described later.

On the other hand, when it is determined in the process of step S11 that the value of the confirmed partition type is not "0x05" (NO in step S11), the erase control unit 23 determines that the format of the partitions included in the NAND flash memory 5 is the MBR format and the partition to be processed this time is the primary partition. Then, the erase control unit 23 confirms a partition start position (a sector ID of a first sector) indicated by the LBA scheme by referring again to the partition table corresponding to the partition to be processed (step S12), and adds the partition to be processed and the confirmed first sector ID, in association with each other to a list indicating a first sector of each partition included in the NAND flash memory 5 (step S13).

Thereafter, the erase control unit 23 determines whether there is a partition that have not been processed yet in the NAND flash memory 5 (step S14), and when it is determined that there is a partition that has not been processed (YES in step S14), the erase control unit 23 executes the process of step S2 in FIG. 4 for the partition that has not been processed. On the other hand, in the process of step S14, when it is determined that there is no partition that has not been processed (NO in step S14), the erase control unit 23 ends the series of processes here.

Figure 6:
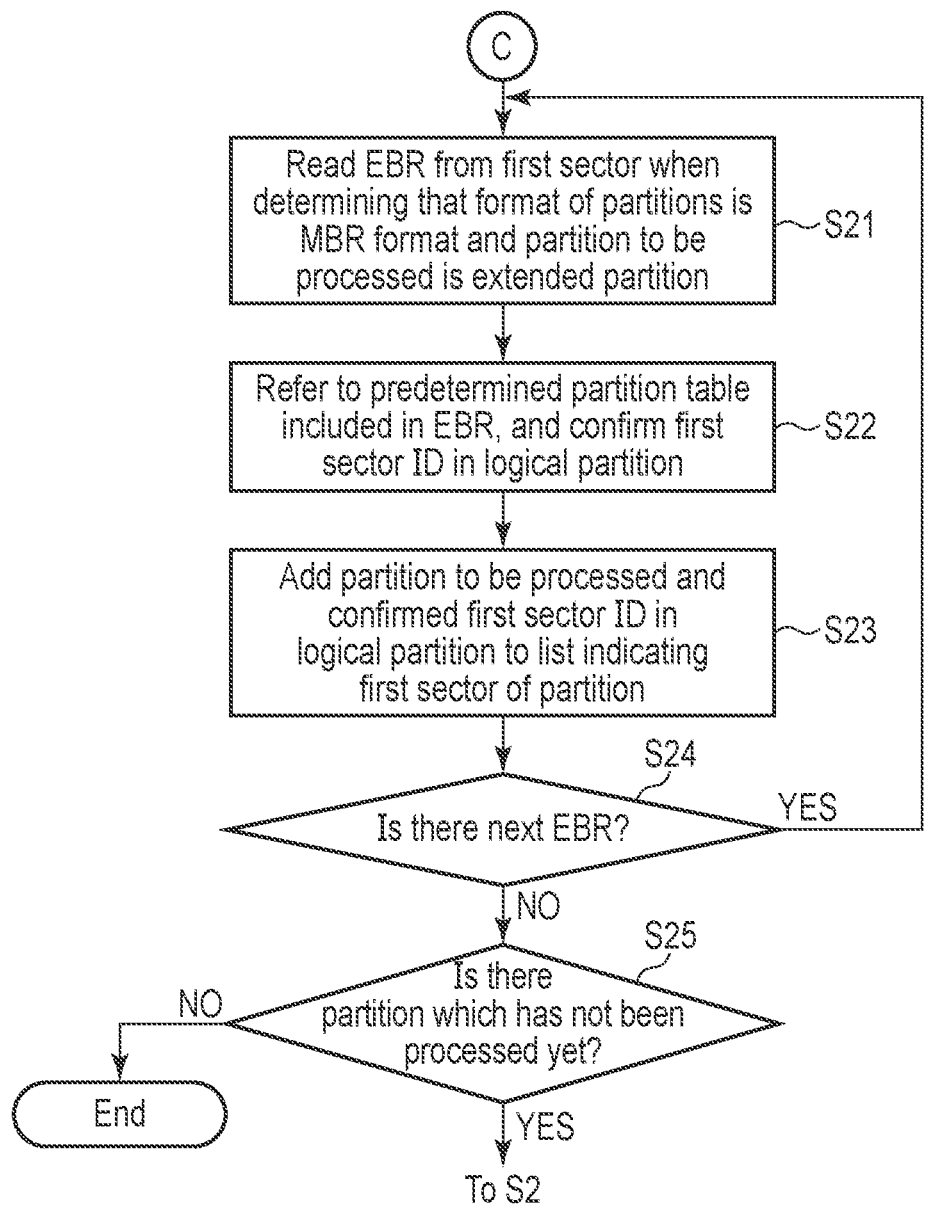
FIG. 6 is a flowchart illustrating a process of specifying another format of each partition included in the NAND flash memory.

Next, the flowchart of FIG. 6 will be described. In FIG. 6, a process to be executed when the partition is the extended partition will be mainly described.

In the process of step S11 illustrated in FIG. 5, when it is determined that the confirmed partition type is "0x05" (YES in step S11), the erase control unit 23 determines that the format of the partitions included in the NAND flash memory 5 is the MBR format and the partition to be processed this time is the extended partition, and then reads an extended boot record (EBR) included in the first sector of the partition to be processed (step S21). Note that the EBR has a same data structure as the MBR 100 and includes information on its own logical partition and the next extended partition. Of the four partition tables included in the EBR, two partition tables are used, and the remaining two partition tables are not used. One of the partition tables used shows information about the logical partition of the partition containing the EBR, and the other partition table shows information indicating a location of a next EBR. However, in the absence of the next EBR, as with the remaining two partition tables described above, the other partition table described above is also not used.

The erase control unit 23 confirms the partition start position (sector ID of the first sector in the logical partition) indicated by the LBA scheme with reference to a predetermined partition table included in the read EBR (step S22), and adds the partition to be processed and the confirmed first sector ID in the logical partition in association with each other to a list indicating a first sector of each partition included in the NAND flash memory 5 (step S23).

Subsequently, the erase control unit 23 determines whether information indicating the next EBR is included in the read EBR (step S24). In the process of step S24, when it is determined that the read EBR includes information indicating the next EBR (YES in step S24), the erase control unit 23 executes the process of step S21 in order to read the next EBR.

On the other hand, in the process of step S24, when it is determined that the read EBR does not include information indicating the next EBR (NO in step S24), it is determined whether there is a partition that has not been processed in the NAND flash memory 5 (step S25), and when it is determined that there is a partition that has not been processed (YES in step S25), the erase control unit 23 executes the process of step S2 of FIG. 4 for the partition that has not been processed. On the other hand, in the process of step S25, when it is determined that there is no partition that has not been processed (NO in step S25), the erase control unit 23 ends the series of processes here.

Furthermore, the flowchart of FIG. 7 will be described. In FIG. 7, a process to be executed when the partition format is the GPT format will be mainly described.

In the process of step S6 illustrated in FIG. 4, when it is determined that the calculated total number of partition sectors matches the confirmed total number of partition sectors (YES in step S6), the erase control unit 23 reads the first GPT header after determining that the format of the partitions included in the NAND flash memory 5 is the GPT format, and confirms the signature included in the read first GPT header (step S31).

The erase control unit 23 determines whether or not a value of the confirmed signature is "0x5452415020494645" indicating GPT (step S32). In the process of step S32, when it is determined that the value of the confirmed signature is not "0x5452415020494645" (NO in step S32), the erase control unit 23 determines that there is a contradiction and determines that the format of the partitions included in the NAND flash memory 5 is an unknown format (step S33), and ends the series of processes here.

On the other hand, in the process of step S32, when it is determined that the value of the confirmed signature is "0x5452415020494645" (YES in step S32), the erase control unit 23 reads a predetermined partition entry located next to the first GPT header (step S34). The erase control unit 23 confirms a first sector ID and a last sector ID by referring to the read partition entry (step S35), and adds the partition to be processed and the first sector ID and last sector ID which have been confirmed, in association with each other to a list indicating a first sector and a last sector of each partition included in the NAND flash memory 5 (step S36).

Thereafter, the erase control unit 23 determines whether there is a partition that has not been processed yet in the NAND flash memory 5 (step S37), and when it is determined that there is a partition that has not been processed (YES in step S37), the erase control unit 23 executes the process of step S34 for the partition that has not been processed. On the other hand, in the process of step S37, when it is determined that there is no partition that has not been processed (NO in step S37), the erase control unit 23 ends the series of processes here.

Next, with reference to the flowcharts of FIGS. 8 to 11, (2) the process of specifying each type of file system that manages each partition will be described in detail. FIGS. 8 to 11 are flowcharts illustrating an example of a processing procedure to be executed by the erase control unit 23 to specify each type of file system that manages each partition.

Figure 8:
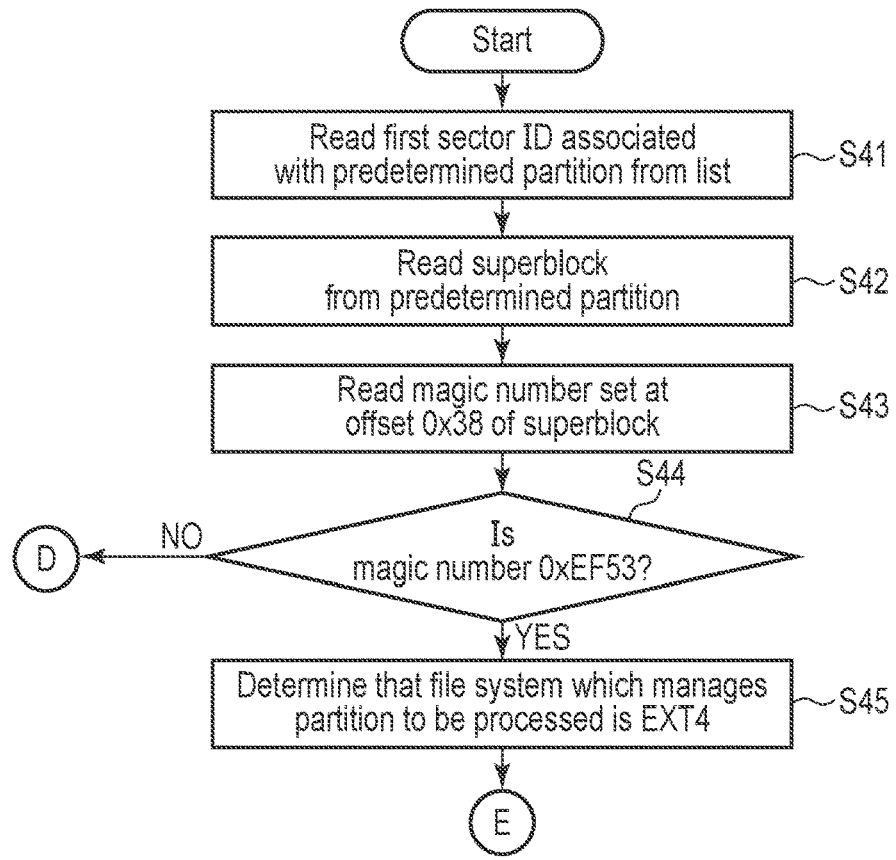
FIG. 8 is a flowchart illustrating a process of specifying a type of file system that manages a partition.

In FIG. 8, a process of determining (specifying) whether the file system is EXT4 (first file system) will be described.

First, the erase control unit 23 reads the first sector ID associated with a predetermined partition from the list (step S41). Subsequently, the erase control unit 23 refers to the read first sector ID to specify a sector ID (second sector ID) of a next sector of the first sector of the predetermined partition, reads a superblock from the next sector (step S42), and reads a magic number set at the offset 0x38 of the read superblock (step S43).

The erase control unit 23 determines whether the read magic number is "0xEF53" indicating EXT4 (step S44). In the process of step S44, when it is determined that the read magic number is not "0xEF53" (NO in step S44), the erase control unit 23 executes a process of step S51 illustrated in FIG. 9 to be described later.

On the other hand, in the process of step S44, when it is determined that the read magic number is "0xEF53" (YES in step S44), the erase control unit 23 determines that the file system that manages the partition to be processed is EXT4 (step S45), and executes a process of step S81 illustrated in FIG. 13 to be described later.

Figure 9:
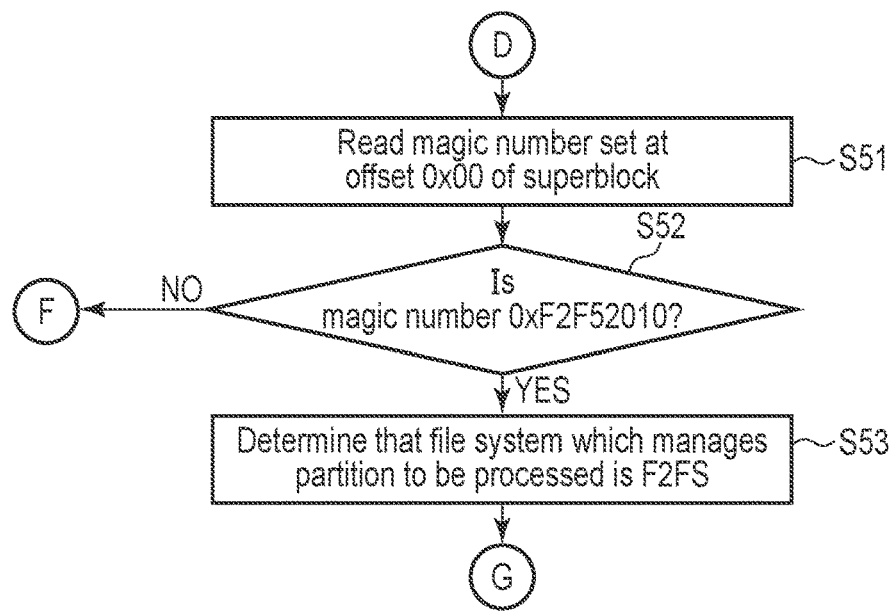
FIG. 9 is a flowchart illustrating a process of specifying another type of file system that manages a partition.

Next, the flowchart of FIG. 9 will be described. In FIG. 9, a process of determining (specifying) whether the file system is F2FS (second file system) will be described.

When it is determined in the process of step S44 illustrated in FIG. 8 that the read magic number is not "0xEF53" (NO in step S44), the erase control unit 23 reads a magic number set at the offset 0x00 of the read superblock in the process of step S42 (step S51).

The erase control unit 23 determines whether the read magic number is "0xF2F52010" indicating F2FS (step S52). In the process of step S52, when it is determined that the read magic number is not "0xF2F52010" (NO in step S52), the erase control unit 23 executes the process of step S61 illustrated in FIG. 10 to be described later.

On the other hand, when it is determined in the process of step S52 that the read magic number is "0xF2F52010" (YES in step S52), the erase control unit 23 determines that the file system that manages the partition to be processed is F2FS (step S53), and executes a process of step S91 illustrated in FIG. 15 to be described later.

Figure 10:
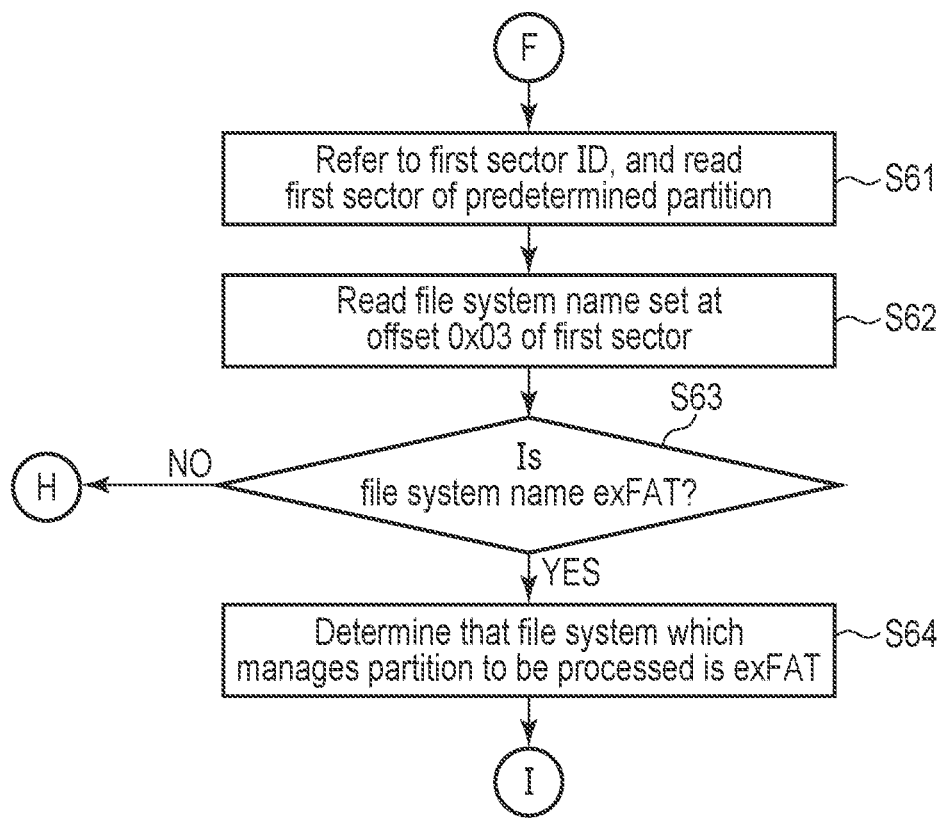
FIG. 10 is a flowchart illustrating a process of specifying another type of file system that manages a partition.

Next, the flowchart of FIG. 10 will be described. In FIG. 10, a process of determining (specifying) whether the file system is exFAT (third file system) will be described.

In the process of step S52 illustrated in FIG. 9, when it is determined that the read magic number is not "0xF2F52010" (NO in step S52), the erase control unit 23 refers to the first sector ID which has been read in the process of step S41 and reads the first sector of the predetermined partition (step S61). The erase control unit 23 reads a file system name set at the offset 0x03 of the read first sector (step S62).

The erase control unit 23 determines whether the read file system name is "exFAT" (step S63). When it is determined in the process of step S63 that the read file system name is not "exFAT" (NO in step S63), the erase control unit 23 executes a process of step S71 illustrated in FIG. 11 to be described later.

On the other hand, when it is determined that the read file system name in step S63 is "exFAT" (YES in step S63), the erase control unit 23 determines that the file system that manages the partition to be processed is exFAT (step S64), and executes a process of step S111 illustrated in FIG. 17 to be described later.

Figure 11:
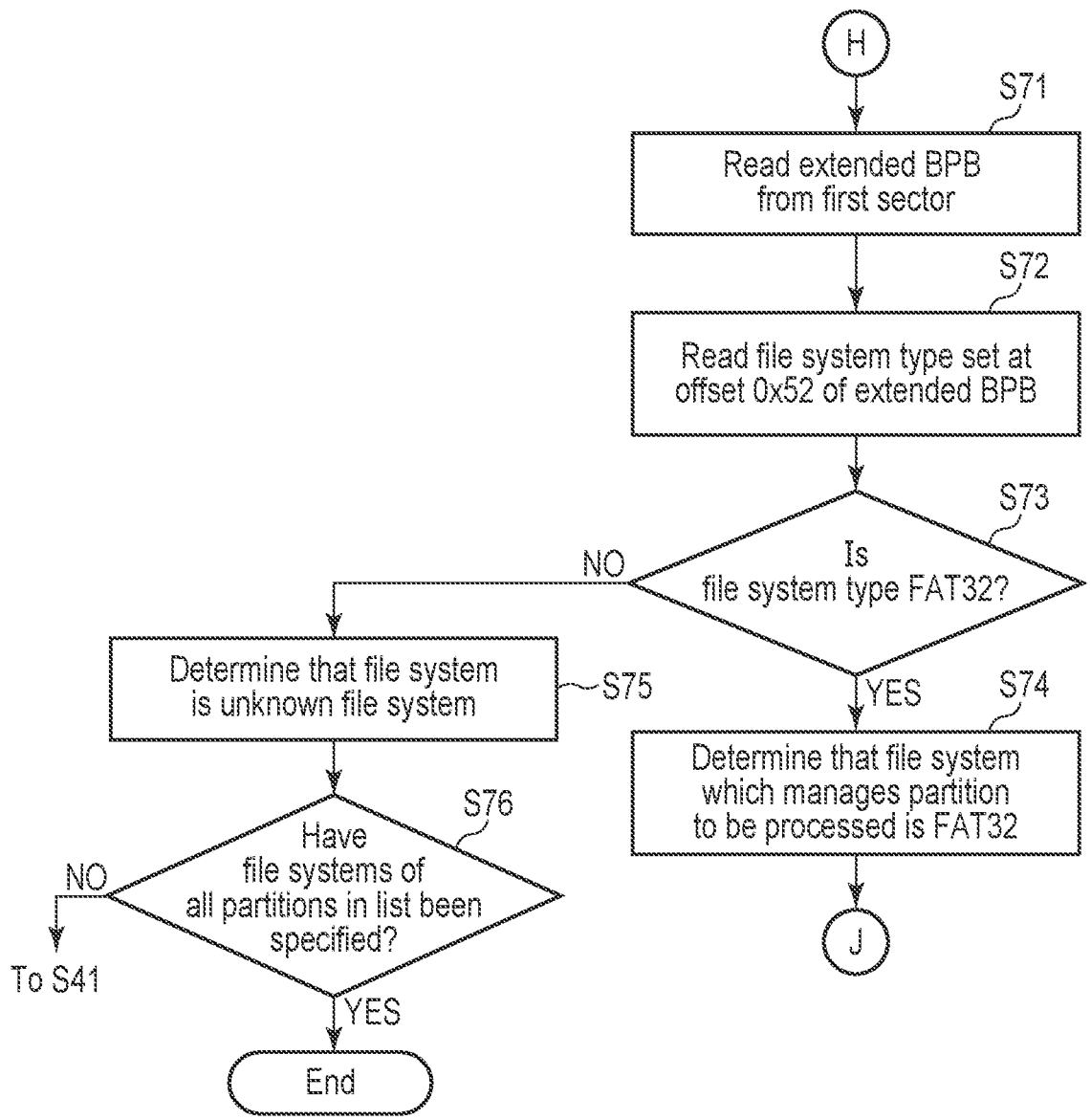
FIG. 11 is a flowchart illustrating a process of specifying another type of file system that manages a partition.

Furthermore, the flowchart of FIG. 11 will be described. In FIG. 11, a process of determining (specifying) whether the file system is FAT32 (fourth file system) will be described.

In the process of step S63 illustrated in FIG. 10, when it is determined that the read file system name is not "exFAT" (NO of step S63), the erase control unit 23 reads an extended Basic Input Output System (BIOS)-parameter-block (BPB) included in the first sector which has been read in the process of step S61 (step S71). The erase control unit 23 reads a file system type set at the offset 0x52 of the read extended BPB (step S72).

The erase control unit 23 determines whether the read file system type is "FAT32" (step S73). When it is determined in the process of step S73 that the read file system type is "FAT32" (YES in step S73), the erase control unit 23 determines that the file system that manages the partition to be processed is FAT32 (step S74), and executes a process of step S121 illustrated in FIG. 19 to be described later.

On the other hand, when it is determined in the process of step S73 that the read file system type is not "FAT32" (NO in step S73), the erase control unit 23 determines that the file system that manages the partition to be processed is an unknown file system (step S75).

Thereafter, the erase control unit 23 determines whether file systems of all the partitions in the list have been specified (step S76), and when it is determined that the file systems of all the partitions in the list have not been specified yet (NO in step S76), the process of step S41 in FIG. 8 is executed with another partition in the list as a processing target. On the other hand, in the process of step S76, when it is determined that the file systems of all the partitions in the list have been specified (YES in step S76), the erase control unit 23 ends a series of data erasing processes.

Next, with reference to FIGS. 12 to 19, (3) the process of detecting whether data has been logically erased and physically erasing data when the logical erasure of the data is detected will be described in detail.

FIG. 12 is the diagram illustrating a layout of the file system EXT4.

As illustrated in FIG. 12, the file system EXT4 includes a boot block 140 arranged as a first sector and a plurality of block groups 141 (0th block group to nth block group). The boot block 140 includes a boot loader. The block groups 141 include a plurality of blocks, and the blocks include a plurality of data blocks 148.

Each of the block groups 141 includes a superblock 142, a group descriptor table (GDT) 143, a reserved GDT 144, a data block bitmap 145, an i-node bitmap 146, an i-node table 147, and a data block 148.

The superblock 142 indicates information (metadata) about the file system. Specifically, the superblock 142 indicates a total number of i-nodes, the number of free i-nodes, the number of free blocks, and the like. The GDT 143 is a set of group descriptors indicating an address of the data block bitmap 145, an address of the i-node bitmap 146, an address of the i-node table 147, and the like as information regarding the block group 141. The reserved GDT 144 is a reserved area for extending the GDT 143 when the block group 141 increases due to the extension of the file system. The data block bitmap 145 indicates a usage status of the data block. The i-node bitmap 146 indicates the status of use of i-nodes. The i-node table 147 is an area for storing i-nodes such as files and directories. The data block 148 is an area for storing data.

Figure 13:
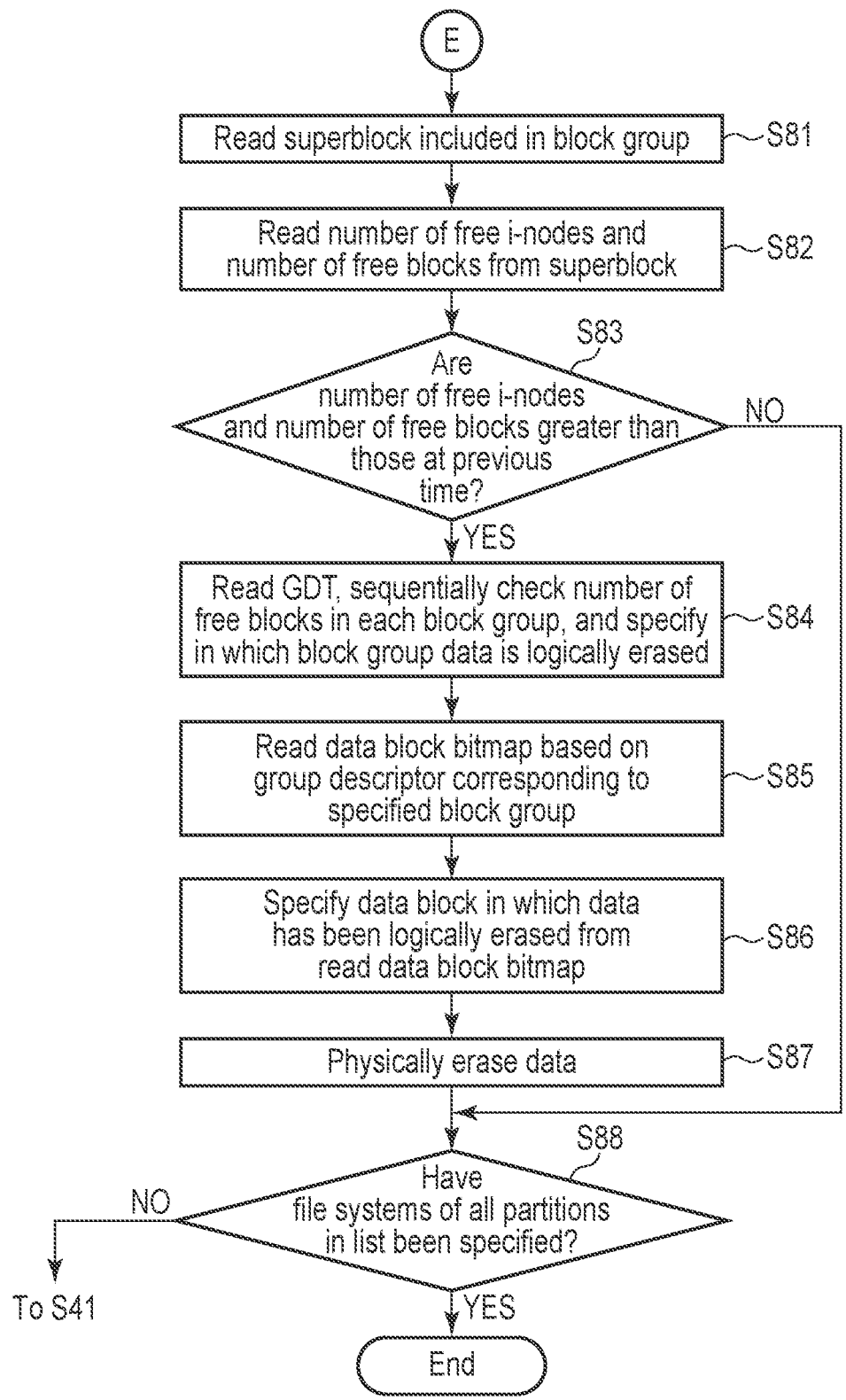
FIG. 13 is a flowchart illustrating a process to be executed to erase data when a file system that manages a partition is EXT4.

FIG. 13 is the flowchart illustrating an example of a processing procedure to be executed when the file system that manages the partition is EXT4.

When determining that the file system that manages the partition to be processed is EXT4 in the process of step S45 illustrated in FIG. 8, the erase control unit 23 reads the superblock 142 included in the block group 141 (step S81). Next, the erase control unit 23 reads the number of free i-nodes and the number of free blocks from the read superblock 142 (step S82), and determines whether the read number of free i-nodes and the read number of free blocks are greater than those at the time of a previous data erasing process (previous values) (step S83). It is assumed that the previous value is stored in an arbitrary temporary storage area such as the internal buffer 16 of the controller 4.

Note that the number of free i-nodes and the number of free blocks read from the superblock 142 indicate not physical free space but logical free space. That is, the number of free i-nodes indicates a sum of the number of unused i-nodes and the number of i-nodes allocated to invalid data. The number of free blocks indicates a sum of the number of unused data blocks and the number of data blocks including invalid data.

In the process of step S83, when it is determined that the read number of free i-nodes and the read number of free blocks are greater than those at the time of the previous data erasing process (YES in step S83), the erase control unit 23 reads the GDT 143 included in the block group 141 and sequentially checks whether the number of free blocks in each block group 141 is greater than the previous value to specify in which block group 141 data is logically erased (step S84).

The erase control unit 23 reads the address of the data block bitmap 145 from a group descriptor corresponding to the specified block group 141, refers to the address, and reads the data block bitmap 145 (step S85). The erase control unit 23 refers to the read data block bitmap 145 and specifies a data block 148 (that is, the data block 148 including invalid data) in which the data has been logically erased (step S86).

The erase control unit 23 moves the valid data in a block including the specified data block 148 to another block, updates the L2P table 31, maps a physical address of the movement destination to a logical address of the moved valid data, and then physically erases data from the block including the specified data block 148 (step S87). According to this, the block including the data block 148 specified in the process of step S86 can be released as a free block.

Thereafter, the erase control unit 23 determines whether the file systems of all the partitions in the list have been specified (step S88), and when it is determined that the file systems of all the partitions in the list have not been specified yet (NO in step S88), the process of step S41 in FIG. 8 is executed for another partition in the list.

On the other hand, when it is determined that the file systems of all the partitions in the list have been specified (YES in step S88), the erase control unit 23 ends the series of data erasing processes.

FIG. 14 is the diagram illustrating a layout of the file system F2FS.

As illustrated in FIG. 14, the file system F2FS is divided into two areas of a metadata area 150 in which metadata is stored and a main area 151 in which data blocks and node blocks are stored. The metadata area 150 is further divided into five areas of a superblock area (SB area) 152, a check point area (CP area) 153, a segment information table area (SIT area) 154, a node address table area (NAT area) 155, and a segment summary area (SSA area) 156.

In the SB area 152, a boot block and a superblock are stored. The superblock indicates basic information for managing a partition. Specifically, the superblock indicates a block address or the like indicating a start position of each area 151 to 156. Information regarding the file system such as the number of valid i-nodes, the number of valid nodes, and the number of valid blocks is periodically stored in the CP area 153. The SIT area 154 stores the number of valid blocks and a SIT indicating a bitmap of all valid blocks. A NAT indicating addresses of node blocks is stored in the NAT area 155. The SSA area 156 stores attribute information of the main area and the node blocks.

Figure 15:
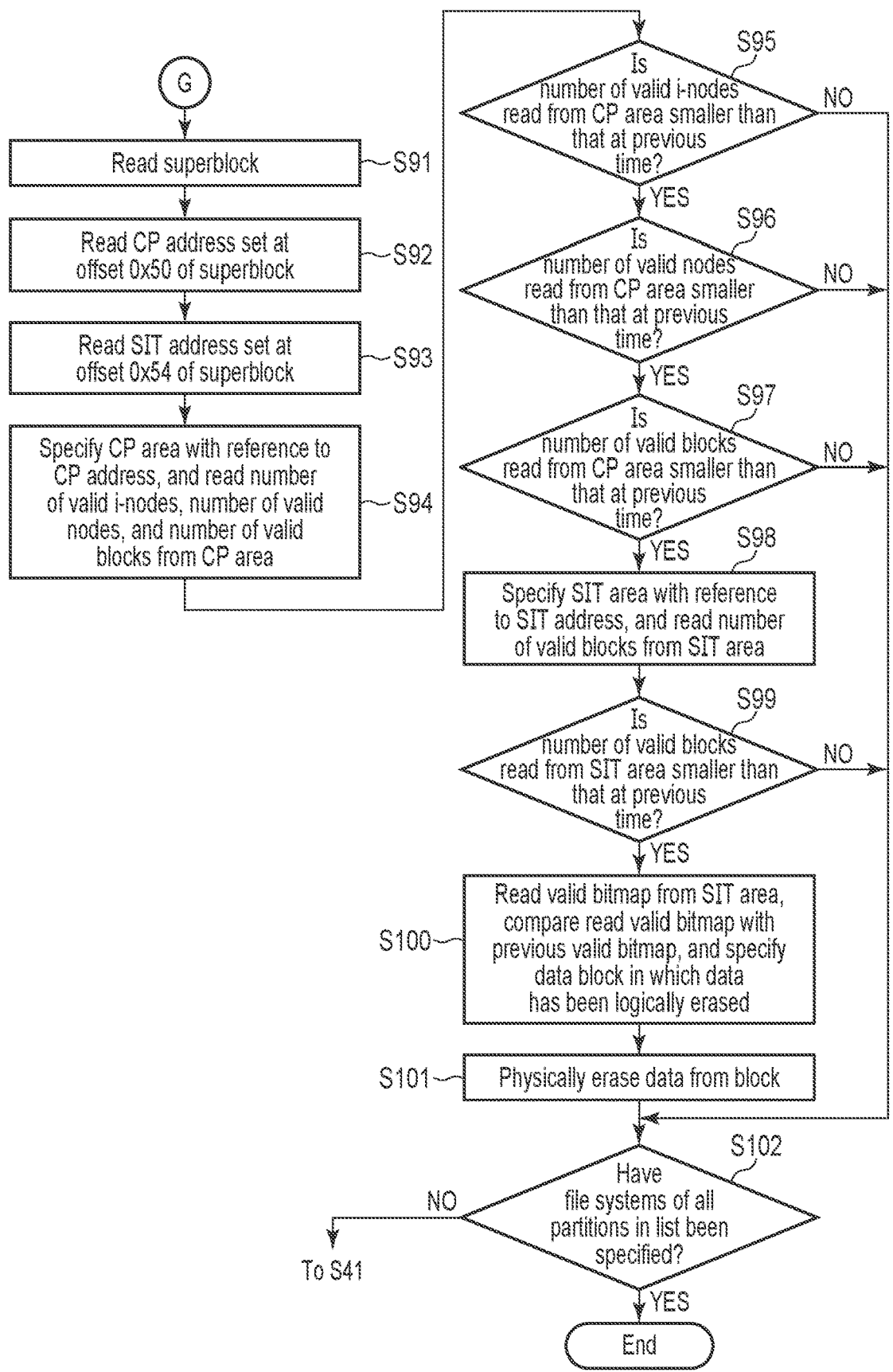
FIG. 15 is a flowchart illustrating a process to be executed to erase data when a file system that manages a partition is F2FS.

FIG. 15 is the flowchart illustrating an example of a processing procedure to be executed when a file system that manages a partition is F2FS.

When determining that the file system that manages the partition to be processed is the F2FS in the process of step S53 illustrated in FIG. 9, the erase control unit 23 reads the superblock from the SB area 152 (step S91). Next, the erase control unit 23 reads a block address (CP address) indicating a start position of the CP area 153 set to the offset 0x50 of the read superblock (step S92). The erase control unit 23 reads a block address (SIT address) indicating a start position of the SIT area 154 set at the offset 0x54 of the read superblock (step S93).

The erase control unit 23 specifies the CP area 153 with reference to the read CP address, and reads the number of valid i-nodes, the number of valid nodes, and the number of valid blocks from the CP area 153 (step S94). Note that the number of valid i-nodes, the number of valid nodes, and the number of valid blocks indicate the number of available i-nodes, the number of available nodes, and the number of available blocks.

The erase control unit 23 determines whether the number of valid i-nodes read from the CP area 153 is smaller than that at the time of a previous data erasing process (previous value) (step S95). It is assumed that the previous value is stored in an arbitrary temporary storage area such as the internal buffer 16 of the controller 4.

In the process of step S95, when it is determined that the read number of valid i-nodes is not smaller than that at the time of the previous data erasing process (NO in step S95), the erase control unit 23 determines that logical erasure of data has not been performed since the previous data erasing process, and executes a process of step S102 to be described later.

On the other hand, in the process of step S95, when it is determined that the read number of valid i-nodes is smaller than that at the time of the previous data erasing process (YES in step S95), the erase control unit 23 determines whether the number of valid nodes read from the CP area 153 is smaller than that at the time of the previous data erasing process (step S96).

In the process of step S96, when it is determined that the read number of valid nodes is not smaller than that at the time of the previous data erasing process (NO in step S96), the erase control unit 23 determines that the logical erasure of data has not been performed since the previous data erasing process, and executes the process of step S102 to be described later.

On the other hand, when it is determined in the process of step S96 that the read number of valid nodes is smaller than that at the time of the previous data erasing process (YES in step S96), the erase control unit 23 determines whether the number of valid blocks read from the CP area 153 is smaller than that at the time of the previous data erasing process (step S97).

In the process of step S97, when it is determined that the read number of valid blocks is not smaller than that at the time of the previous data erasing process (NO in step S97), the erase control unit 23 determines that the logical erasure of data has not been performed since the previous data erasing process, and executes the process of step S102 to be described later.

On the other hand, when it is determined in the process of step S97 that the read number of valid blocks is smaller than that at the time of the previous data erasing process (YES in step S97), the erase control unit 23 refers to the read SIT address to specify the SIT area 154, and reads the number of valid blocks from the SIT area 154 (step S98).

The erase control unit 23 determines whether the number of valid blocks read from the SIT area 154 is smaller than that at the time of the previous data erasing process (step S99).

In the process of step S99, when it is determined that the read number of valid blocks is not smaller than that at the time of the previous data erasing process (NO in step S99), the erase control unit 23 determines that the logical erasure of data has not been performed since the previous data erasing process, and executes the process of step S102 to be described later.

On the other hand, when it is determined in the process of step S99 that the read number of valid blocks is smaller than that at the time of the previous data erasing process (YES in step S99), the erase control unit 23 reads a valid bitmap from the SIT area 154, compares the read valid bitmap with a valid bitmap in the previous data erasing process, and specifies a data block in which data has been logically erased (step S100).

The erase control unit 23 moves the valid data in the block including the specified data block to another block, updates the L2P table 31, maps a physical address of the movement destination to a logical address of the moved valid data, and then physically erases data from the block including the specified data block (step S101). According to this, the block including the data block specified in the process of step S100 can be released as a free block.

Thereafter, the erase control unit 23 determines whether the file systems of all the partitions in the list have been specified (step S102), and when it is determined that the file systems of all the partitions in the list have not been specified yet (NO in step S102), the process of step S41 in FIG. 8 is executed for another partition in the list.

On the other hand, when it is determined that the file systems of all the partitions in the list have been specified (YES in step S102), the erase control unit 23 ends the series of data erasing processes.

FIG. 16 is the diagram illustrating a layout of the file system exFAT.

As illustrated in FIG. 16, the file system exFAT is divided into three areas of a boot area 160, a file allocation table area (FAT area) 161, and a data area 162. A boot sector and the like are stored in the boot area 160. The boot sector indicates, for example, a start cluster ID of a root directory. The FAT area 161 stores a FAT indicating arrangement of files in the data area 162. In the data area 162, data is managed in units of a cluster including a plurality of sectors.

The data area 162 stores an allocation bitmap indicating a usage status of the clusters.

Figure 17:
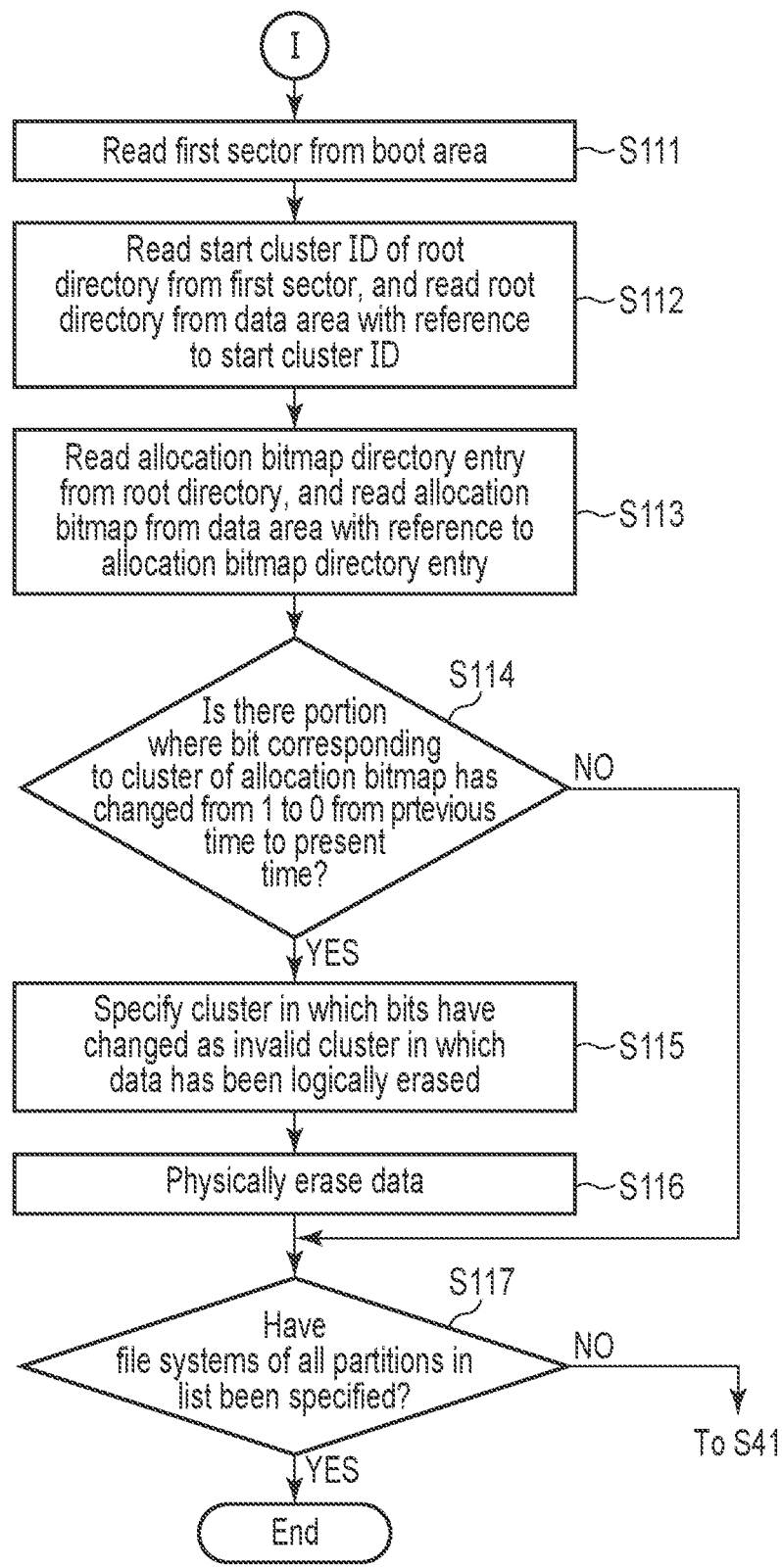
FIG. 17 is a flowchart illustrating a process to be executed to erase data when a file system that manages a partition is exFAT.

FIG. 17 is the flowchart illustrating an example of a processing procedure to be executed when a file system that manages a partition is exFAT.

When determining that the file system that manages the partition to be processed is exFAT in the process of step S64 illustrated in FIG. 10, the erase control unit 23 reads the first sector from the boot area 160 (step S111). Next, the erase control unit 23 reads the start cluster ID of the root directory from the read first sector, and reads the root directory from the data area 162 with reference to the read start cluster ID (step S112).

The erase control unit 23 reads an allocation bitmap directory entry from the read root directory, and reads the allocation bitmap from the data area 162 with reference to the read allocation bitmap directory entry (step S113).

The erase control unit 23 compares the read allocation bitmap with an allocation bitmap at the time of a previous data erasing process, and determines whether there is a portion where a bit corresponding to the cluster of the allocation bitmap has changed from 1 to 0 from the previous time to the present time (step S114). In the process of step S114, when it is determined that there is no portion that has changed from the previous time to the present time (NO in step S114), the erase control unit 23 determines that logical erasure of data has not been performed since the time of a previous data erasing process, and executes a process of step S117 to be described later.

On the other hand, in the process of step S114, when it is determined that there is a portion that has changed from a previous time to the present (YES in step S114), the erase control unit 23 specifies a cluster in which bits have changed from 1 to 0 as an invalid cluster in which data has been logically erased (step S115). It is assumed that the allocation bitmap at the time of the previous data erasing process is stored in an arbitrary temporary storage area such as the internal buffer 16 of the controller 4.

The erase control unit 23 moves the valid cluster in the block including the specified invalid cluster to another block, updates the L2P table 31, maps a physical address of the movement destination to a logical address of a plurality of pieces of valid data constituting the moved valid cluster, and then physically erases data from the block including the specified invalid cluster (step S116). According to this, the block including the invalid cluster specified in the process of step S115 can be released as a free block.

Thereafter, the erase control unit 23 determines whether the file systems of all the partitions in the list have been specified (step S117), and when it is determined that the file systems of all the partitions in the list have not been specified yet (NO in step S117), the process of step S41 in FIG. 8 is executed for another partition in the list.

On the other hand, when it is determined that the file systems of all the partitions in the list have been specified (YES in step S117), the erase control unit 23 ends the series of data erasing processes.

Figure 18:
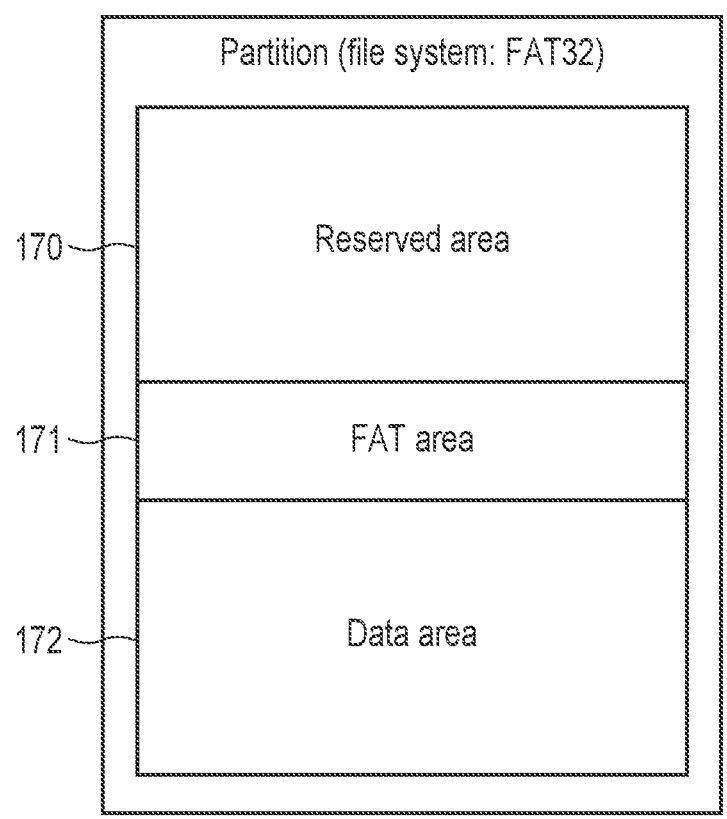
FIG. 18 is a diagram illustrating a layout of a file system FAT32.

FIG. 18 is the diagram illustrating a layout of file system FAT32.

As illustrated in FIG. 18, the file system FAT32 is divided into three areas of reserved area 170, file allocation table area (FAT area) 171, and data area 172. A boot sector and a reserved sector are stored in the reserved area 170. The reserved sector indicates the number of sectors in the reserved area 170. The FAT area 171 stores a FAT indicating arrangement of files in the data area 172. In the data area 172, data is managed in units of a cluster being a collection of a plurality of sectors.

Figure 19:
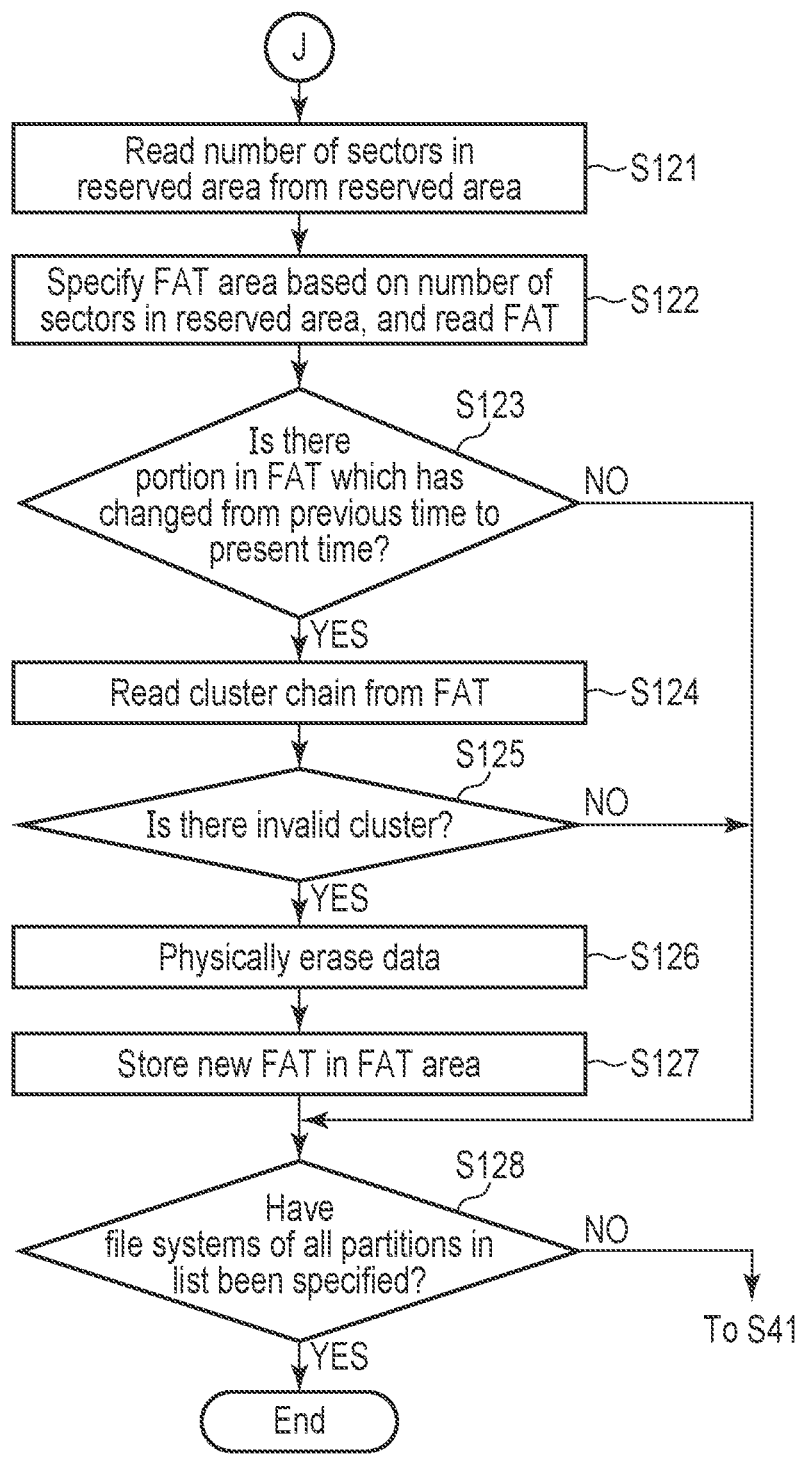
FIG. 19 is a flowchart illustrating a process to be executed to erase data when a file system that manages a partition is FAT32.

FIG. 19 is the flowchart illustrating an example of a processing procedure to be executed when a file system that manages a partition is FAT32.

When determining that the file system that manages the partition to be processed is FAT32 in the process of step S74 illustrated in FIG. 11, the erase control unit 23 reads the reserved sector from reserved area 170 (step S121). Next, the erase control unit 23 specifies a start position of the FAT area 171 based on the number of sectors in the reserved area 170, indicated by the read reserved sector, and reads a FAT from the FAT area 171 (step S122).

The erase control unit 23 compares the read FAT with an FAT at the time of a previous data erasing process, and determines whether there is a portion changed from the previous time to the present time (step S123). In the process of step S123, when it is determined that there is no portion that has changed from the previous time to the present time (NO in step S123), the erase control unit 23 determines that logical erasure of data has not been performed since the time of the previous data erasing process, and executes a process of step S128 to be described later. It is assumed that the FAT at the time of the previous data erasing process is stored in an arbitrary temporary storage area such as the internal buffer 16 of the controller 4.

On the other hand, when it is determined in the process of step S123 that there is a portion which has changed from the previous time to the present time (YES in step S123), the erase control unit 23 reads the cluster chain from the read FAT (step S124), compares the read cluster chain with the cluster chain read from the FAT at the time of the previous data erasing process, determines whether there is a portion where the bit has changed from 1 to 0 from the previous time to the present time, and determines whether there is an invalid cluster (step S125). In the process of step S125, when it is determined that there is no invalid cluster (NO in step S125), the erase control unit 23 determines that the logical erasure of data has not been performed since the previous data erasing process, and executes a process of step S128 to be described later.

On the other hand, when it is determined in the process of step S125 that there is an invalid cluster (YES in step S125), the erase control unit 23 moves the valid cluster in the block including the invalid cluster to another block, updates the L2P table 31, maps a physical address of the movement destination to a logical address of a plurality of pieces of valid data constituting the moved valid cluster, and then physically erases data from the block including the invalid cluster (step S126). According to this, the block including the invalid cluster specified in the process of step S125 can be released as a free block.

The erase control unit 23 stores a new FAT updated according to the physical erasure of the data in the FAT area 171 (step S127).

Thereafter, the erase control unit 23 determines whether the file systems of all the partitions in the list have been specified (step S128), and when it is determined that the file systems of all the partitions in the list have not been specified yet (NO in step S128), the process of step S41 in FIG. 8 is executed for another partition in the list.

On the other hand, when it is determined that the file systems of all the partitions in the list have been specified (YES in step S128), the erase control unit 23 ends the series of data erasing processes.

Here, a process to be executed when an erase request is received from the host 2 will be described with reference to the flowchart of FIG. 20. The erase request from the host 2 is a request including any of a Discard command, a Trim command, and an Erase command. The erase request includes at least a command code indicating an erase request and information indicating a block in which data is physically erased (that is, information indicating a block to be released as a free block).

First, when receiving the erase request from the host 2 via the host interface 11 (step S131), the controller 4 of the SSD 3 checks whether the data erase processing function of the erase control unit 23 is turned on (step S132).

In the process of step S132, when it is confirmed that the data erase processing function of the erase control unit 23 is not turned on, that is, is turned off (NO in step S132), the controller 4 physically erases data with respect to the block indicated by the information included in the erase request according to the received erase request (step S133), and ends the process here.

On the other hand, in the process of step S132, when it is confirmed that the data erase processing function of the erase control unit 23 is turned on (YES in step S132), the controller 4 specifies a format of the partitions included in the NAND flash memory 5 using the data erase processing function of the erase control unit 23 and specifies a type of file system that manages a partition, and then confirms the number of pieces of logically erased data from the time of a previous data erasing process to the present by a method consistent with the specified file system (step S134).

The controller 4 determines whether the number of pieces of logically erased data exceeds a preset upper limit value (step S135). In the process of step S135, when it is determined that the number of pieces of logically erased data exceeds the upper limit value (YES in step S135), the controller 4 executes the process of step S133 after changing the data erase processing function of the erase control unit 23 from on to off (step S136).

On the other hand, when it is determined in the process of step S135 that the number of pieces of logically erased data does not exceed the upper limit value (NO in step S135), the controller 4 determines to physically erase the logically erased data by the erase control unit 23 at the time of a next data erasing process (step S137) without following the erase request from the host 2, and ends the processing here.

According to the processing illustrated in FIG. 20, when the number of pieces of logically erased data exceeds the upper limit value, it is determined that it takes time to physically erase the data by the data erase processing function of the erase control unit 23, and thus, the physical erasure of the data according to the erase request from the host 2 is preferentially performed. On the other hand, when the number of pieces of logically erased data does not exceed the upper limit value, it is possible to continuously perform active physical erasure of data by the data erase processing function of the erase control unit 23 without following the erase request from the host 2.

In addition, when data is to be physically erased in accordance with the erase request from the host 2, the controller 4 turns off the data erase processing function of the erase control unit 23 and then physically erases the data in accordance with the erase request from the host 2. Therefore, it is possible to physically erase the data without causing a collision between the erase request from the host 2 and the data erase processing function of the erase control unit 23.

According to the embodiment described above, by specifying the format of the partitions included in the NAND flash memory 5 and specifying the type of the file system that manages the partition, the erase control unit 23 can monitor a state of the NAND flash memory 5 in a manner consistent with various file systems. In addition, by monitoring the state of the NAND flash memory 5, when logical erasure of data is detected, the erase control unit 23 can specify where the logically erased data (invalid data) is stored by a method consistent with the specified file system and physically erase the data.

According to this, since the SSD 3 can actively physically erase data even without an instruction from the host 2 and even not at a timing when the GC is performed, it is possible to always suppress an occurrence of a situation in which a storage area of the NAND flash memory 5 is uselessly used due to invalid data and the storage area is insufficient. That is, the performance of the SSD 3 can be improved.

In the present embodiment, the NAND flash memory is exemplified as the non-volatile memory. However, the function of the present embodiment can also be applied to various other nonvolatile memories, such as, for example, a magnetoresistive random access memory (MRAM), a phase-change random access memory (PRAM), a resistive random access memory (ReRAM), or a ferroelectric random access memory (FeRAM).

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
 a non-volatile memory; and
 a controller electrically connected to the non-volatile memory and configured to control the non-volatile memory,
 wherein the controller comprises a data erasure processing function and is configured to:
  specify a partition format of a predetermined partition included in the non-volatile memory based on master boot record information stored in the non-volatile memory,
  specify a first sector and a second sector of the predetermined partition based on the specified partition format,
  specify a file system that manages the predetermined partition based on first information included in the first sector and second information included in the second sector,
  specify logically erased first data and physically erase the first data when logical erasure of data in the predetermined partition is detected by a method consistent with the specified file system, read a superblock included in the second sector as the second information, and specify the file system as a first file system when a magic number set at a first offset of the superblock indicates a first value, wherein the first offset is 0x38, and the first value is 0xEF53.

2. The memory system of claim 1, wherein the controller is configured to:

read an extended bios-parameter-block included in the first sector as the first information, and when a file system type set at a fourth offset of the extended bios parameter block indicates a fourth file system, specify the file system as the fourth file system.

3. The memory system of claim 2, wherein the fourth offset is 0x52.

4. The memory system of claim 2, wherein the controller is configured to:

compare a current file allocation table with a previous file allocation table when the file system is specified as the fourth file system, when there is a portion that has changed from a previous time to a present time, detect logical erasure of data in the predetermined partition, and physically erase the first data.

5. The memory system of claim 1, wherein the controller is configured to:

control ON/OFF of the data erase processing function, when an erase request from the host is received and the data erase processing function is turned on, confirm a number of pieces of the first data logically erased in the predetermined partition from a previous data erase processing to the present by a method consistent with the file system specified by the data erase processing function, when the number of pieces of the first data exceeds a preset upper limit value, control the data erase processing function from on to off, and physically erase the first data according to the erase request from the host, when the number of pieces of the first data does not exceed the preset upper limit value, physically erase the first data by the data erase processing function at a time of a next data erasing process without following any type of erase request from the host.

6. A memory system connectable to a host, the memory system comprising:

a non-volatile memory; and a controller electrically connected to the non-volatile memory and configured to control the non-volatile memory, wherein the controller comprises a data erasure processing function and is configured to:

specify a partition format of a predetermined partition included in the non-volatile memory based on master boot record information stored in the non-volatile memory, specify a first sector and a second sector of the predetermined partition based on the specified partition format, specify a file system that manages the predetermined partition based on first information included in the first sector and second information included in the second sector, specify logically erased first data and physically erase the first data when logical erasure of data in the predetermined partition is detected by a method consistent with the specified file system, read a superblock included in the second sector as the second information, specify the file system as a first file system when a magic number set at a first offset of the superblock indicates a first value, specify a current number of free i-nodes and a current number of free blocks when the file system is specified as the first file system, when the specified current number of free i-nodes is greater than a previous number of free i-nodes and the specified current number of free blocks is greater than a previous number of free blocks, detect logical erasure of data in the predetermined partition, and physically erase the first data.

7. A memory system connectable to a host, the memory system comprising:

a non-volatile memory; and a controller electrically connected to the non-volatile memory and configured to control the non-volatile memory, wherein the controller comprises a data erasure processing function and is configured to:

specify a partition format of a predetermined partition included in the non-volatile memory based on master boot record information stored in the non-volatile memory, specify a first sector and a second sector of the predetermined partition based on the specified partition format, specify a file system that manages the predetermined partition based on first information included in the first sector and second information included in the second sector, specify logically erased first data and physically erase the first data when logical erasure of data in the predetermined partition is detected by a method consistent with the specified file system, read a superblock included in the second sector as the second information, specify the file system as a second file system when a magic number set at a second offset of the superblock indicates a second value, specify a current number of valid i-nodes, a current number of valid nodes, and a current number of valid blocks when the file system is specified as the second file system, when the specified current number of valid i-nodes is smaller than a previous number of valid i-nodes, the specified current number of valid nodes is smaller than a previous number of valid nodes and the specified current number of valid blocks is smaller than a previous number of valid blocks, detect logical erasure of data in the predetermined partition, and physically erase the first data.

8. A memory system connectable to a host, the memory system comprising:

a non-volatile memory; and a controller electrically connected to the non-volatile memory and configured to control the non-volatile memory, wherein the controller comprises a data erasure processing function and is configured to:

specify a partition format of a predetermined partition included in the non-volatile memory based on master boot record information stored in the non-volatile memory, specify a first sector and a second sector of the predetermined partition based on the specified partition format, specify a file system that manages the predetermined partition based on first information included in the first sector and second information included in the second sector, specify logically erased first data and physically erase the first data when logical erasure of data in the predetermined partition is detected by a method consistent with the specified file system, read a file system name set at a third offset of the first sector as the first information, and when the file system name indicates a third file system, specify the file system as the third file system, wherein the third offset is 0x03.

9. The memory system of claim 8, wherein the controller is configured to:

compare a current allocation bitmap with a previous allocation bitmap when the file system is specified as the third file system, when there is a portion in which a bit corresponding to a cluster changes from 1 to 0 from a previous time to a present time, detects logical erasure of data in the predetermined partition, and physically erase the first data.

10. A memory system connectable to a host, the memory system comprising:

a non-volatile memory; and a controller electrically connected to the non-volatile memory and configured to control the non-volatile memory, wherein the controller comprises a data erasure processing function and is configured to:

specify a partition format of a predetermined partition included in the non-volatile memory based on master boot record information stored in the non-volatile memory, specify a first sector and a second sector of the predetermined partition based on the specified partition format, specify a file system that manages the predetermined partition based on first information included in the first sector and second information included in the second sector, specify logically erased first data and physically erase the first data when logical erasure of data in the predetermined partition is detected by a method consistent with the specified file system, read a superblock included in the second sector as the second information, and specify the file system as a second file system when a magic number set at a second offset of the superblock indicates a second value, wherein the second offset is 0x00, and the second value is 0xF2F52010.

* * * * *